(12) United States Patent
Van Antwerp et al.

(10) Patent No.: US 10,911,956 B2
(45) Date of Patent: Feb. 2, 2021

(54) METHODS AND SYSTEMS TO DETECT ROGUE HOTSPOTS

(71) Applicant: Comcast Cable Communications, LLC, Philadelphia, PA (US)

(72) Inventors: Ryan Van Antwerp, Glen Mills, PA (US); James Bradley Hein, King of Prussia, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 290 days.

(21) Appl. No.: 15/809,825

(22) Filed: Nov. 10, 2017

(65) Prior Publication Data
US 2019/0149994 A1 May 16, 2019

(51) Int. Cl.
| | | |
|---|---|---|
| H04L 29/06 | (2006.01) | |
| H04W 12/12 | (2021.01) | |
| H04W 12/08 | (2021.01) | |
| H04W 12/06 | (2021.01) | |
| H04W 24/10 | (2009.01) | |
| H04W 48/16 | (2009.01) | |
| H04W 8/00 | (2009.01) | |
| H04W 12/00 | (2021.01) | |
| G06F 21/44 | (2013.01) | |
| H04W 48/20 | (2009.01) | |

(52) U.S. Cl.
CPC .......... *H04W 12/12* (2013.01); *H04L 63/101* (2013.01); *H04W 8/005* (2013.01); *H04W 12/00516* (2019.01); *H04W 12/06* (2013.01); *H04W 12/08* (2013.01); *H04W 12/1202* (2019.01); *H04W 24/10* (2013.01); *H04W 48/16* (2013.01); *G06F 21/44* (2013.01); *H04L 63/1408* (2013.01); *H04W 48/20* (2013.01)

(58) Field of Classification Search
CPC .......... H04W 8/005; H04W 12/00516; H04W 12/06; H04W 12/08; H04W 12/10; H04W 12/12; H04W 12/1202; H04W 48/20; H04L 63/08; H04L 63/101; H04L 63/12; H04L 63/14; H04L 63/1408; H04L 63/1466; H04L 63/1483
See application file for complete search history.

(56) References Cited

U.S. PATENT DOCUMENTS

| | | | | |
|---|---|---|---|---|
| 9,412,278 | B1 * | 8/2016 | Gong | G06F 16/29 |
| 9,882,931 | B1 * | 1/2018 | Harmon | H04L 63/1483 |
| 2006/0193299 | A1 * | 8/2006 | Winget | H04L 63/107 370/338 |
| 2007/0079376 | A1 * | 4/2007 | Robert | H04L 63/1408 726/23 |
| 2007/0094741 | A1 * | 4/2007 | Lynn | H04L 41/0893 726/26 |

(Continued)

FOREIGN PATENT DOCUMENTS

WO WO-2018162744 A1 * 9/2018 ............ H04W 12/12

*Primary Examiner* — Eric W Shepperd
(74) *Attorney, Agent, or Firm* — Ballard Spahr LLP

(57) ABSTRACT

Methods, systems, and apparatuses are described for identifying unauthorized (e.g., rogue) access points. Authorized access points can detect the presence of rogue access points by determining signal strengths associated with other access points. A detected variance from an expected signal strength can indicate a presence of a rogue access point.

48 Claims, 7 Drawing Sheets

(56) References Cited

U.S. PATENT DOCUMENTS

Figure 1:
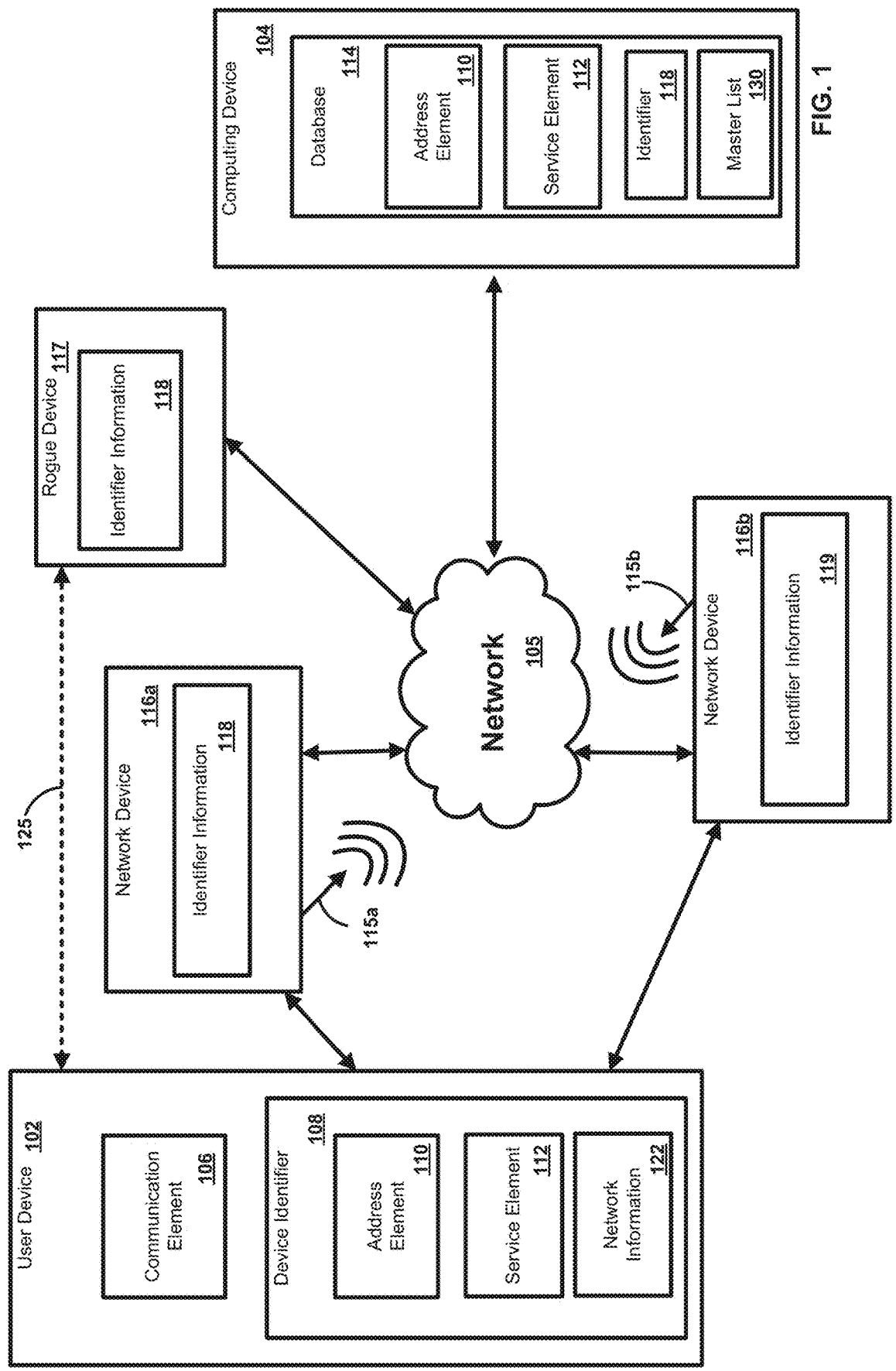

| | | | |
|---|---|---|---|
| 2007/0189194 A1* | 8/2007 | Hrastar | H04L 63/1408 370/310 |
| 2007/0206527 A1* | 9/2007 | Lo | H04L 63/0272 370/328 |
| 2007/0298720 A1* | 12/2007 | Wolman | H04L 63/1408 455/66.1 |
| 2008/0002651 A1* | 1/2008 | Nakano | H04K 3/22 370/338 |
| 2009/0104889 A1* | 4/2009 | Lotvonen | H04L 63/1441 455/410 |
| 2011/0151833 A1* | 6/2011 | Snider | B60R 25/1025 455/410 |
| 2011/0151834 A1* | 6/2011 | Dabholkar | B60R 25/10 455/410 |
| 2011/0287779 A1* | 11/2011 | Harper | H04W 4/025 455/456.1 |
| 2012/0026887 A1* | 2/2012 | Vempati | H04W 8/005 370/241 |
| 2014/0064116 A1* | 3/2014 | Linde | H04W 4/021 370/252 |
| 2014/0273949 A1* | 9/2014 | Duggan | H04W 12/08 455/410 |
| 2016/0192136 A1* | 6/2016 | Pan | H04W 12/06 455/456.1 |
| 2016/0227571 A1* | 8/2016 | Baek | H04W 16/14 |
| 2016/0277427 A1* | 9/2016 | Deshpande | H04L 63/1416 |
| 2016/0381545 A1* | 12/2016 | Wang | H04W 12/12 455/434 |
| 2017/0006417 A1* | 1/2017 | Canoy | H04W 12/10 |
| 2017/0346853 A1* | 11/2017 | Wyatt | G06F 21/577 |

* cited by examiner

METHODS AND SYSTEMS TO DETECT ROGUE HOTSPOTS

BACKGROUND

Rogue hotspots (e.g., unauthorized access points) masquerade as authorized access points to trick a user and/or user device into connecting to the rogue hotspot by broadcasting network credentials that resemble an authorized access point. A device (e.g., user device, mobile device, network device, etc.) can connect to the rogue access point unaware that it is not connected to an authorized access point. The rogue access point can then obtain sensitive information associated with the device and/or harm the device. Rogue hotspots have presented a challenge and, as yet, no workable solution has been developed for their detection. These and other shortcomings are addressed by the methods and systems disclosed herein.

SUMMARY

It is to be understood that both the following general description and the following detailed description provide examples, are explanatory only, and are not restrictive. Provided are methods and systems for detecting rogue hotspots (e.g., unauthorized access points).

"Man-in-the-middle" attacks can involve rogue hotspots. Rogue hotspots are devices that copy identifier information such as service set identifiers (SSIDs) and media access control (MAC) addresses associated with access points to trick devices in to believing they are in communication with the access point when they are actually in communication with the rogue hotspot. When a device, such as a user device, smartphone, laptop, etc., connects to the rogue hotspot, the rogue hotspot can obtain access to data communications associated with the device because the device is now transmitting and receiving data via the rogue access point.

One or more access points can be used to detect the rogue hotspot by determining, via periodic scans of the network, the presence of other access points and creating/storing a list of the access points. The list of the access points can also comprise signal strength information associated with each of the one or more access points. Subsequent scans of the network can be used to look for the characteristics of a rogue hotspot, such as inconsistent or fluctuating signal strength measurements which can indicate that a rogue hotspot has copied the identifier information of an access point (e.g., a now compromised access point). The copied identifier information can be stored as compromised identifier information. Based on the detection of the rogue hotspot, actions can be taken to remove the rogue hotspot from the network, such as causing the compromised access point to disassociate (e.g., disconnect, cease communication, deauthenticate, etc . . . ) with devices (e.g., user devices) in communication with the compromised access point and generating new identifier information for the compromised access point, for example.

Additional advantages will be set forth in part in the description which follows or may be learned by practice. The advantages will be realized and attained by means of the elements and combinations particularly pointed out in the appended claims.

BRIEF DESCRIPTION OF TILE DRAWINGS

Figure 2:
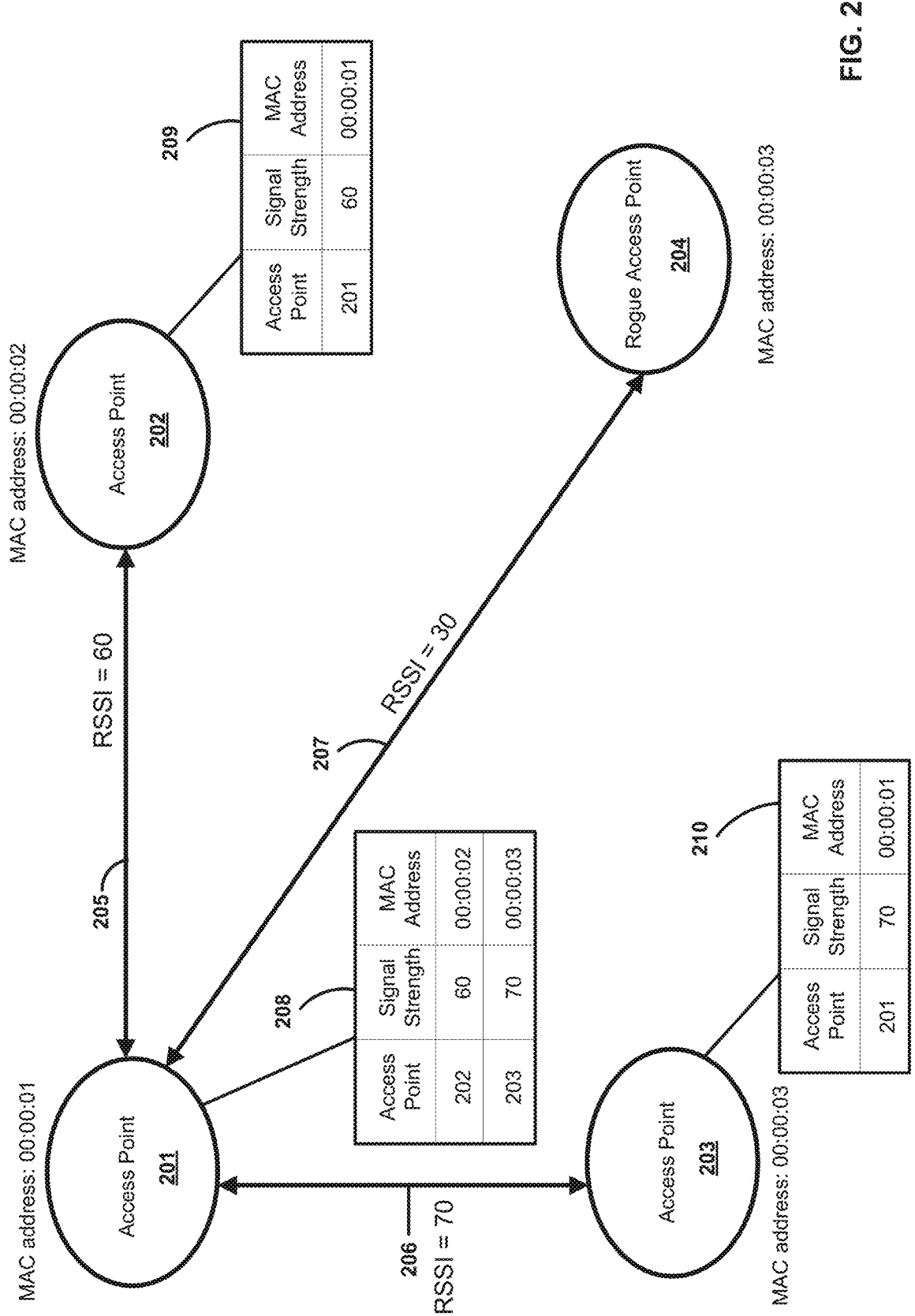
Figure 3:
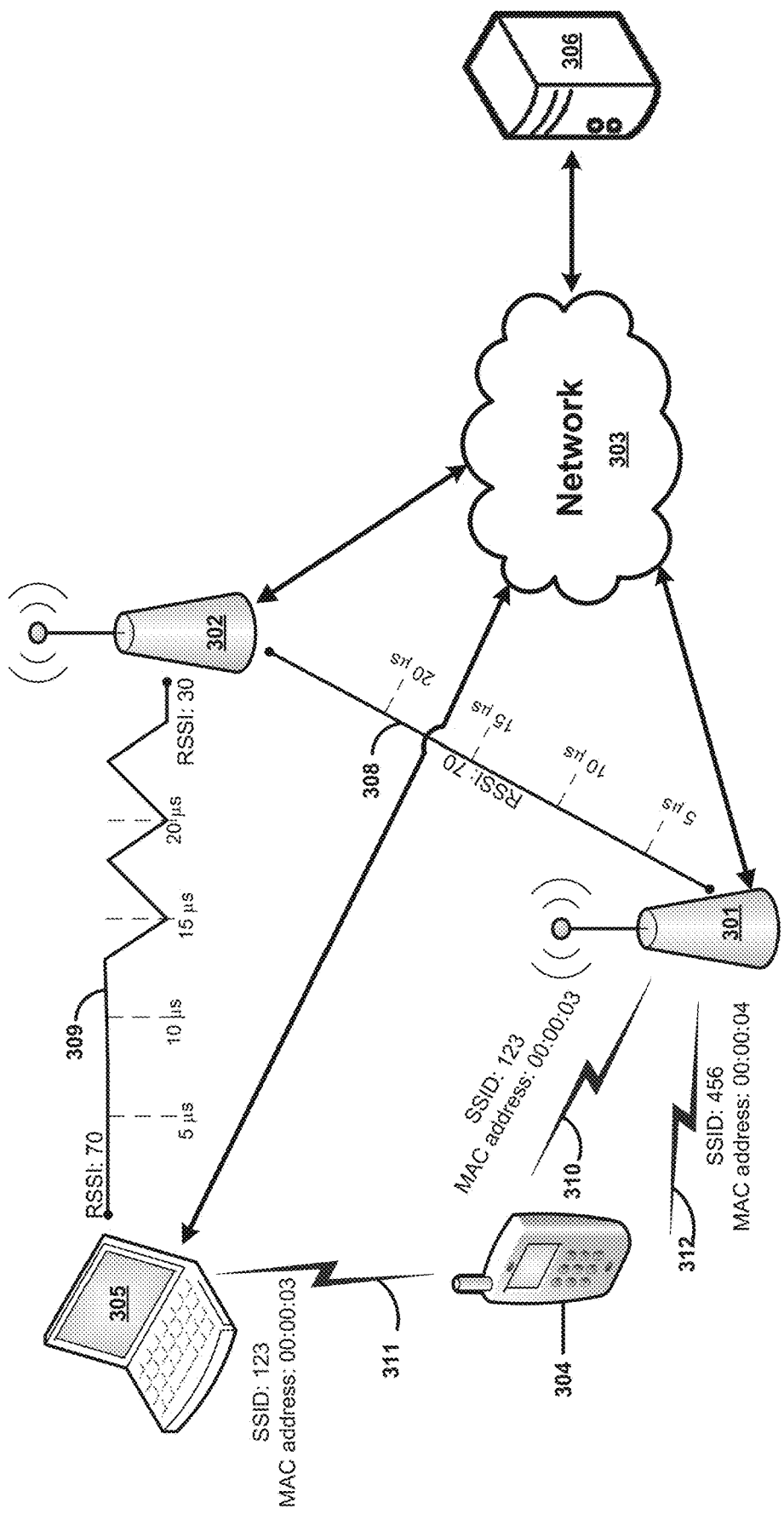
Figure 4:
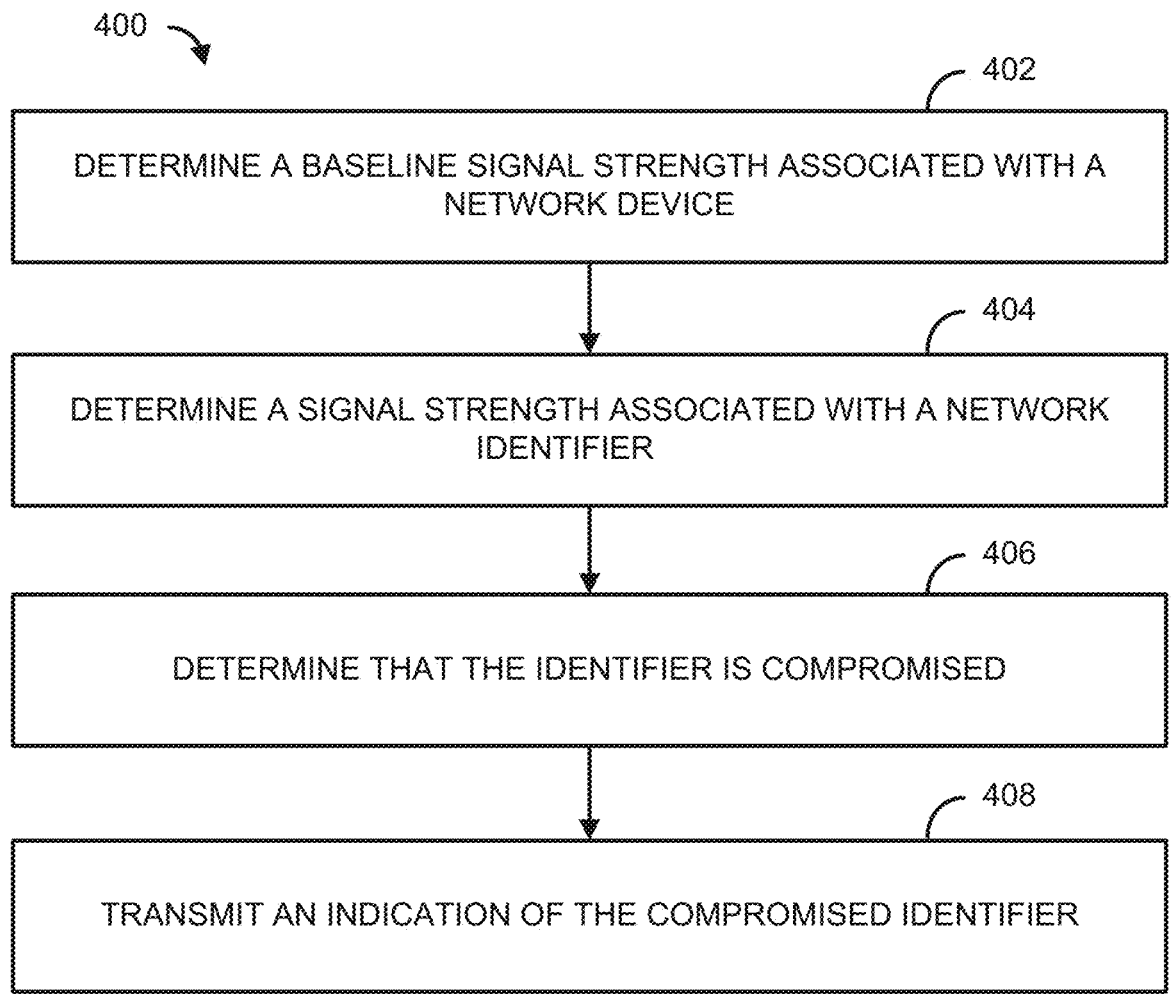
Figure 5:
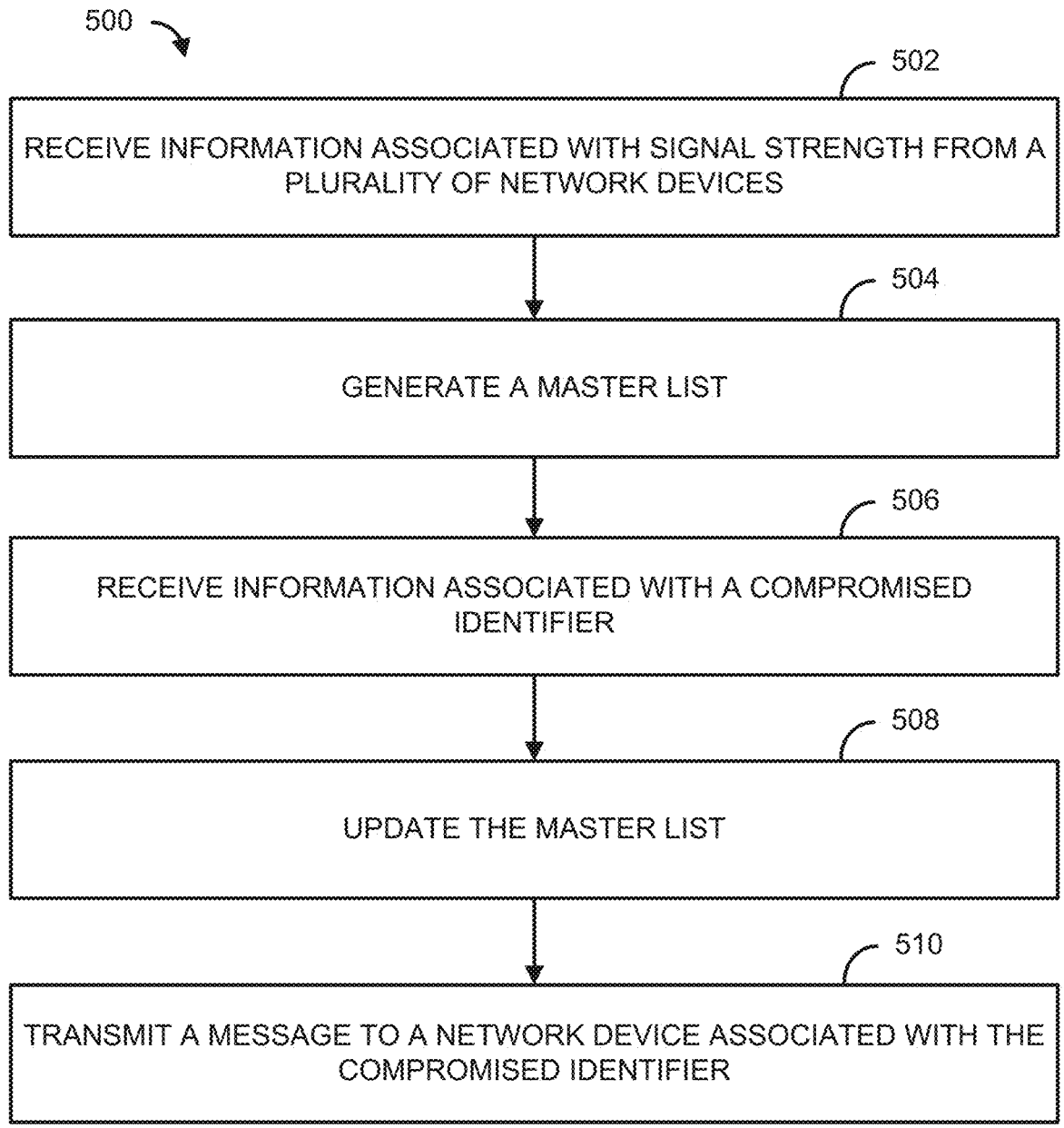
Figure 6:
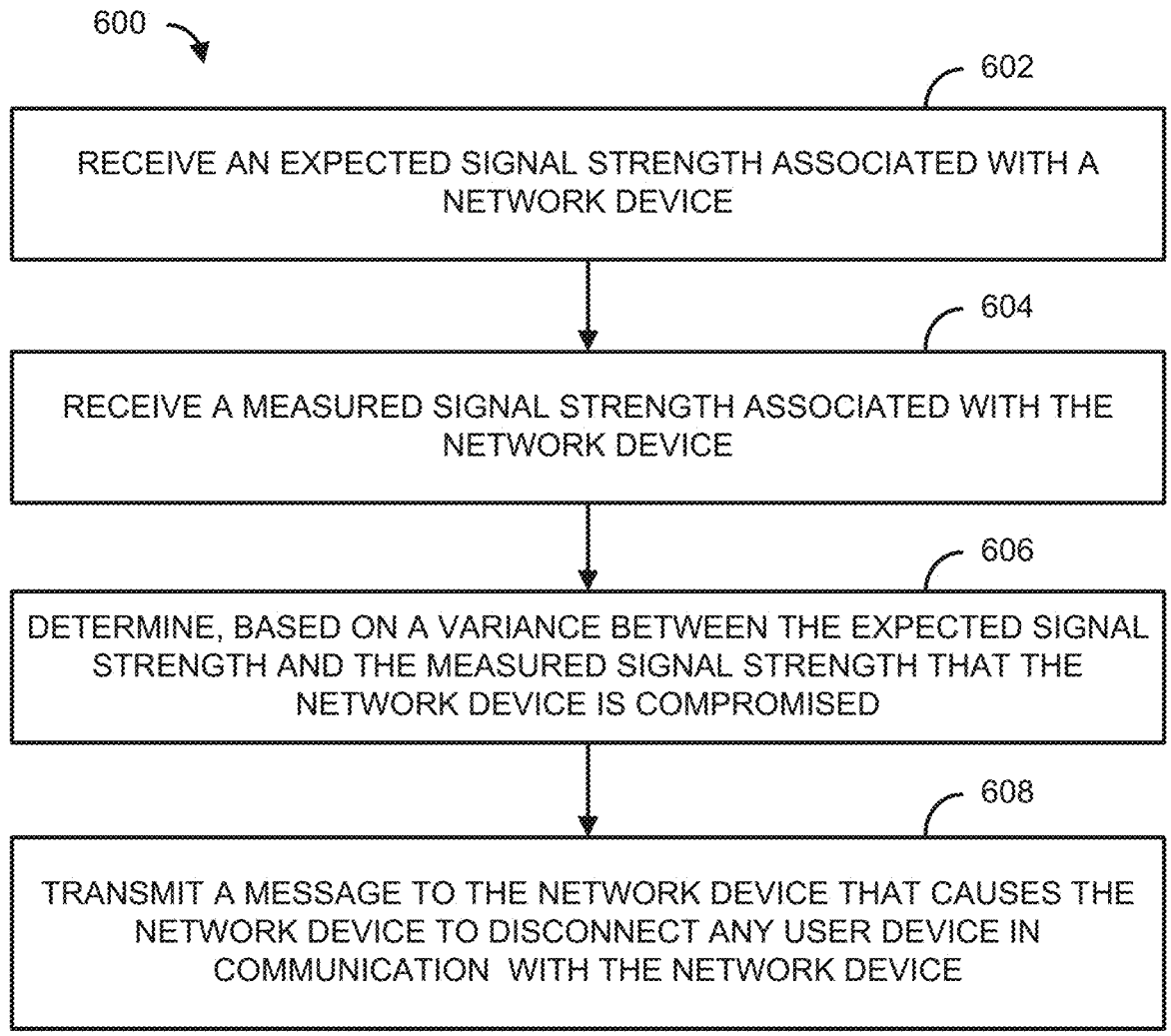
Figure 7:
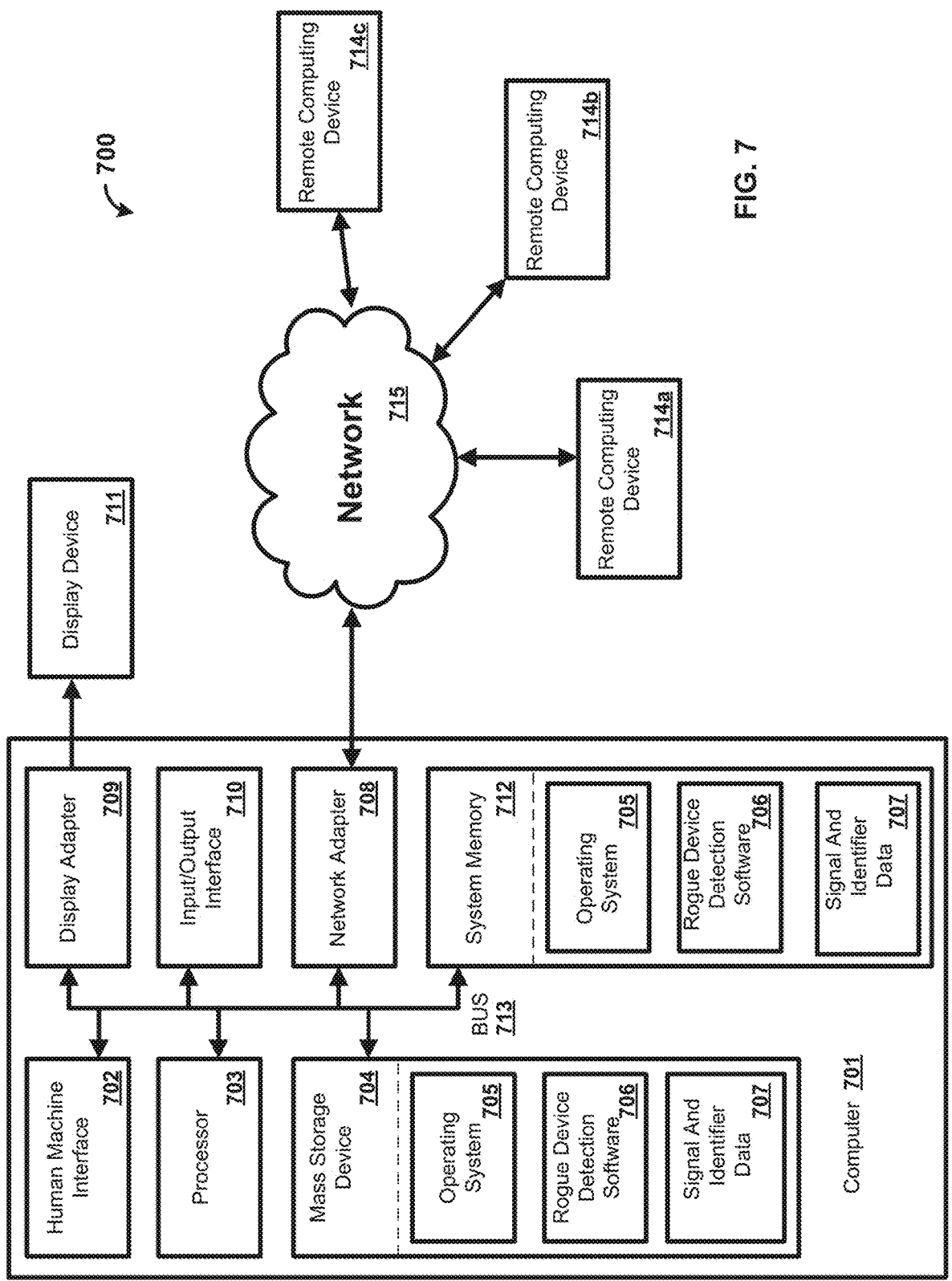

The accompanying drawings, which are incorporated in and constitute a part of this specification, provide examples and together with the description, serve to explain the principles of the methods and systems:

FIG. 1 is a block diagram of an example system;
FIG. 2 is a diagram of an example system;
FIG. 3 is a diagram of an example system;
FIG. 4 is a flowchart of an example method;
FIG. 5 is a flowchart of an example method;
FIG. 6 is a flowchart of an example method; and
FIG. 7 is a block diagram of an example computing device.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and examples where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all examples of this application including, but not limited to, steps in disclosed methods. If there are a variety of additional steps that can be performed it is understood that each of these additional steps can be performed with any specific example or combination of examples of the disclosed methods.

The present methods and systems may be understood more readily by reference to the following detailed description of preferred examples and other examples included therein and to the Figures and their previous and following description.

As will be appreciated by one skilled in the art, the methods and systems may take the form of an entirely hardware embodiment, an entirely software embodiment, or an embodiment combining software and hardware components. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

This detailed description may refer to content items (which may also be referred to as "content," "content data," "content information," "content asset," "multimedia asset data file," or simply "data" or "information"). Content items can comprise any information or data that may be licensed to one or more individuals (or other entities, such as business or group). In various examples, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various examples, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), MEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some examples, content items may include any combination of the above-described examples.

This detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that this detailed disclosure may refer to a given entity performing some action. It should be understood that this language may in some cases mean that a system (e.g., a computer) owned and/or controlled by the given entity is actually performing the action.

The present disclosure relates to method and systems to detect rogue (e.g., unauthorized, illegitimate, untrusted, spoofing, etc.) network hotspots (e.g., access points). Additionally, the method and systems disclosed can detect compromised access points, such as authorized access points that associated with identifier information (e.g., SSID, MAC address, etc.) that has been copied by a rogue hotspot. A network can comprise a plurality of authorized network access points (e.g., access points authorized to be in communication with the network) that enable devices to be in communication with other devices and/or the network via the network. Rogue hotspots can be unauthorized (e.g., illegitimate, untrusted, spoofing, etc.) network access points, controlled by a malicious entity and/or person, masquerading as authorized network access points. The unauthorized access points may not be an actual access point; instead the unauthorized access point can be a wireless device such as a smartphone, laptop, tablet, computer, mobile computing device, and the like, for example. The unauthorized access point can masquerade as an authorized (e.g., legitimate, trusted, etc.) access point to trick a device/user into being in communication with and/or connecting to the unauthorized access point. For example, the unauthorized access point can masquerade as an authorized access point by using identifier information (e.g., a service set identifier (SSID), a media access control (MAC) address, a name, etc.) that is a copy (e.g., an exact copy, a similarity, a resemblance) of identifier information associated with the authorized access point. A device (e.g., user device, mobile device, network device, etc.) attempting to connect to/be in communication with the network via the authorized access point can actually be in communication with the unauthorized access point. The device can be unaware that it is in communication with the unauthorized access point. The device can transmit and/or receive data/information via the unauthorized access point. The unauthorized access point can obtain sensitive information associated with the device (e.g., user information, personal information, credit card information, login credentials, etc.) and/or take other negative actions (e.g., malware installation) that harm the device and/or a user of the device.

One or more authorized (e.g., legitimate, trusted, etc.) access points of the plurality of authorized access points can detect the unauthorized (e.g., illegitimate, entrusted, etc.) access point. The one or more authorized access points can detect the unauthorized access point by determining that a signal strength (e.g., received signal strength indication (RSSI)) associated with another authorized access point does not coincide with a predetermined signal strength for the another authorized access point. The signal strength associated with the another authorized access point not coinciding with the predetermined signal strength with which it is associated can indicate that identifier information (e.g., a SSID, a MAC address, etc.) associated with the another authorized access point has been copied by an unauthorized access point. An authorized access point associated with identifier information that has been copied by an unauthorized access point is a compromised access point.

Each authorized access point of the plurality of authorized access points can keep track of other authorized access points in proximity by periodically probing/scanning the network. During periodic probes/scans of the network, each authorized access point of the plurality of authorized access points can gather information associated with other authorized access points. The information associated with the other authorized access points can include identifier information (e.g., a SSID, a MAC address, etc.) and other information such as baseline (e.g., routine, consistent, etc.) signal strength (e.g., received signal strength indication (RSSI)) information, RSSI measurements, a name, combinations thereof, and the like. Each of the one or more authorized access points can store the identifier information and any other information associated with the other authorized access points. Further, each of the one or more authorized access points can transmit identifier information (e.g., identifier information associated with other authorized access points) or any other information to a computing device, such as a server/cloud-based device for example. The computing device can determine a confidence level associated with a determination by authorized access points that another authorized access point is a compromised access point (e.g., an authorized access point associated with identifier information that has been copied by an unauthorized access point). The computing device can determine the confidence level by comparing and/or reconciling identifier information associated with a particular authorized access point and received from each of the plurality of authorized access points. If the confidence level satisfies a threshold (e.g., a number of authorized access points providing the same and/or similar identifier information), the computing device can determine/verify that the identifier information associated with the particular authorized access point has been copied by an unauthorized access point and that the particular authorized access point is a compromised access point. The computing device can store the identifier information associated with the compromised access point. For example, the computing device can store the identifier information associated with the compromised access point as compromised identifier information. The computing device can store a record of any received identifier information determined to be compromised by an unauthorized access point in a database comprising a plurality of compromised identifier information.

Based on a determination that a compromised access point exists in the network (and/or that an unauthorized access point exists in the network), actions can be taken to neutralize the effect of the unauthorized access point in the network. Information (e.g., a message, code, etc.) can be sent to the compromised access point that causes the compromised access point to deauthenticate/disassociate devices (e.g., user devices, mobile devices, network devices, etc.) in communication and/or associated with the compromised access point. For example, a message (e.g., a deuthentication frame, etc.) can be sent to the compromised access point that causes the compromised access point to deauthenticate/disassociate devices in communication and/or associated with the compromised access point based on a SSID and/or MAC address associated with the compromised access point. Information (e.g., a message, code, etc.) can be sent to the to the compromised access point that causes the compromised access point to change/modify its associated identifier information. For example, a message can be sent to the compromised access point that causes the compromised access point to change a SSID and/or MAC address with which it is associated with to a new SSID and/or MAC address. The unauthorized access point will be unaware of the new identifier information. For example, the unauthorized access point will be unaware of the new SSID and/or MAC address associated with the previously compromised access point that is now (again) an authorized access point based on the new identifier information. Devices that were previously connected to/in communication with the previously compromised access point can reconnect, re-associate with, and/or be in communication with the previously compromised access point that is now (again), based on the new identifier information, an authorized access point.

Disclosed is a system to detect rogue hotspots (e.g., unauthorized access points, illegitimate access points, untrusted access points, etc.). Additionally, the system disclosed can detect compromised access points, such as authorized access points that are associated with identifier information (e.g., SSID, MAC address, etc.) that has been copied by a rogue hotspot. FIG. 1 depicts an example environment in which the present methods and systems can operate. The present disclosure is relevant to systems and methods for providing unauthorized access point detection services. One or more network devices can be configured to provide various services to one or more devices, such as wireless communication services and unauthorized access point detection services. The network devices can be configured to recognize an authoritative device for a premises (e.g., local network) and/or a wide area network. As an example, an authoritative device (e.g., authorized access point, network device, computing device, server, cloud-based device, etc.) can be configured to govern or enable connectivity to a network such as the Internet or other remote resources, provide address and/or configuration services such as service set identifier (SSID) configuration, media access control (MAC) address configuration, DHCP, and/or provide naming or service discovery services for a premises, wide area network or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 (e.g., a mobile communication device, a computer, a smartphone, a laptop, a tablet, a set top box, a display device, etc.) in communication with a network 105 via a network device (e.g., access point, authorized access point, legitimate access point, trusted access point, etc.). The network and system can comprise a plurality of network devices such as network devices 116a and 116b, for example. The user device 102 and/or the network devices 116a and 116b can be in communication with a computing device 104 (e.g., a server, a network device, a computer, a cloud-based device, etc.). The computing device 104 can be disposed locally or remotely relative to the user device 102 and/or network devices 116a and 116b. The network 105 can comprise one or more networks, such as a wide area network (e.g., a content network, service network, provider network, the Internet), a public network, an open network, a provider managed network, a non-user managed network, a provider controlled network, a non-user controlled network, a local network, a private network, a closed network, a user managed network, a user controlled network, a user deployed network, and/or the like. Other forms of communications can be used, such as wired and wireless telecommunication channels, for example.

The user device 102 can be a communication device, such as a computing device. For example, the user device 102 can comprise a communication element 106 for providing an interface to a user to interact with the user device 102, network devices 116a and 116b, and/or the computing device 104. The communication element 106 can be any interface for presenting information to the user and receiving a user feedback, such as an application client or a web browser (e.g., Internet Explorer, Mozilla Firefox, Google Chrome, Safari, or the like). Other software, hardware, and/or interfaces can be used to provide communication between the user and one or more of the user device 102, the network devices 116a and 116b, and/or the computing device 104. As an example, the communication element 106 can request or query various files from a local source and/or a remote source. As an example, the communication element 106 can receive various files from a local source and/or a remote source. As a further example, the communication element 106 can transmit data to and/or receive data from a local or remote device, such as the computing device 104.

The user device 102 can be associated with a user identifier or device identifier 108. As an example, the device identifier 108 can be any identifier, token, character, string, or the like, for differentiating one user and/or user device (e.g., user device 102) from another user or user device. The device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

The device identifier 108 can comprise an address element 110 and/or a service element 112. The address element 110 can be an internee protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. The address element 110 can be persistent for a particular network and/or location.

The service element 112 can comprise an identification of a service and/or service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. The address element 110 can be used to identify or retrieve the service element 112, or vice versa. As a further example, one or more of the address element 110 and the service element 112 can be stored remotely from the user device 102 and retrieved by one or more devices, such as the user device 102 and the computing device 104. Other information can be represented by e service element 112.

The user device 102 can store identifier information (e.g., identifier information 118, identifier information 119). The identifier information can comprise information such as SSIDs, MAC addresses, passwords, security settings, combinations thereof, and the like associated with one or more networks and/or network devices (e.g., access points, authorized access points, network devices 116a and 116b) to which the user device 102 is authorized to connect. Each network device can be associated with identifier information. For example, the network device 116a can be associated with identifier information 118 and the network device 116b can be associated with identifier information 119. The identifier information (e.g., identifier information 118, identifier information 119) can comprise network credentials (e.g., SSID, MAC address, etc.) for accessing the network devices 116a and 116b.

The identifier information (e.g., identifier information 118, identifier information 119) can comprise a unique identifier for facilitating communications with devices such as user device 102, for example. Further, the network devices 116a and 116b can be in communication with a network, such as the network 105. For example, the network devices 116a and 116b can facilitate the connection of a device, such as the user device 102, to the network 105. As such, the network devices 116a and 116b can be configured as network gateways and/or access points. The network devices 116a and 116b can be configured to allow one or more wireless devices to connect to a wired and/or wireless network using Wi-Fi, Bluetooth or similar standard. The network devices 116a and 116b can be multi-band wireless network devices. The identifier information 118 can comprise service set identifier (SSID) information. The SSID information can comprise basic service set identifier (BSSID) information, extended service set identifier (ESSID) information, combinations thereof, and the like. The network devices 116a and 116b can be configured with a first service set identifier (SSID) to function as a local network for a particular user or users (e.g., associated with a user network or private network). The network devices 116a and 116b can be configured with a second service set identifier (SSID) (e.g., associated with a public/community network, hidden network, or limited services (e.g., provisioning) network) to function as a secondary network or redundant network for connected communication devices. The network devices 116a and 116b can be accessed via identifier information 118 and 119, respectively. Further, the identifier information (e.g., identifier information 118, identifier information 119) can comprise information associated with the network devices 116a and 116b such as the SSID (e.g., SSID, BSSID, ESSID, first SSID, second SSID, etc.) information, password information, security settings, communication signal information, combinations thereof, and the like. Some or all of the identifier information 118 can be stored in an encrypted or hashed form.

The network devices 116a and 116b can be in communication with the computing device 104 to provide the computing device 104 with periodic identifier information (e.g., identifier information associated with authorized access points, identifier information associated with compromised access points, etc.) and/or any other information determined based on a periodic probe/scan 115a, 115b of the network. The network devices 116a and 116b can transmit identifier information (e.g., identifier information associated with authorized access points, identifier information associated with compromised access points, etc.) and/or any other information determined during a periodic probe/scan 115a, 115b to the computing device 104. The computing device 104 can be a network device such as server/cloud-based device in communication with devices such as the network devices 116a and 116b, the user device 102, and any other device for providing services such as unauthorized access point (e.g., rogue hotspot, rogue device 117) detection services. The computing device 104 can allow the network devices 116a and 116b, the user device 102, and any other device to interact with remote resources, such as data, devices, and files. For example, the computing device 104 can be configured as central location (e.g., a headend, or processing facility), which can receive content (e.g., RSSI information, identifier information, data, input programming) from multiple sources. The computing device 104 can combine the content (e.g., the master list 130) from the various sources (e.g., network devices 116a and 116b) and can distribute the content to user (e.g., subscriber) locations, and or any other location via a distribution system.

The computing device 104 can manage the communication between the network devices 116a and 116b, the user device 102, any other device, and a database 114 for sending and receiving data therebetween. For example, the network devices 116a and 116b, the user device 102, and any other device can request and/or retrieve a file from the database 114. The database 114 can store information relating to the network devices 116a and 116b, the user device 102, and any other device (such as compromised identifier information, the identifier information 118, the address element 110, and/or the service element 112), information related to the network device 116, the user device 102, and any other device (such as RSSI information, identifier information associated with one or more network devices, master list 130, etc.).

The network devices 116a and 116b can periodically transmit and/or broadcast at least a portion of the identifier information 118 (e.g., MAC address, SSID, signal strength information, etc.) to other devices, such as another network device (e.g., network devices 116a and 116b), the computing device 104, combinations thereof, and the like. Additionally, the network devices 116a and 116b can periodically transmit and/or broadcast additional information to the other devices. For example, the network devices 116a and 116b can periodically transmit and/or broadcast a beacon comprising the identifier information 118 and/or additional information. The beacon comprising the identifier information 118 can be associated with a signal strength (e.g., a signal strength value, RSSI, etc.) associated with the network devices 116a and 116b. For example, the beacon can inform other devices, such as another network device (e.g., network devices 116a and 116b), the computing device 104, combinations thereof, and the like, that a signal strength associated with the network devices 116a and 116b was and/or is provisioned at a certain value (e.g., decibel value, amplitude value, power value, etc.). The provisioned value of a signal strength associated with a network device (e.g., network devices 116a and 116b) can be a baseline (e.g., consistent, regular, routine, etc.) signal strength associated with a network device (e.g., network devices 116a and 116b). Additionally, the beacon can also comprise information to facilitate a connection between the user device 102 and the network devices 116a and 116b such as an SSID. The beacon can be transmitted over one or more channels and/or frequency bands. The network devices 116a and 116b can transmit and/or receive multiple beacons that can comprise information such as all or at least a portion of the identifier information 118, additional information, and the like.

The network devices 116a and 116b can determine a signal strength associated with another network device (e.g., network devices 116a and 116b) based on measuring a value (e.g., decibel value, amplitude value, power value, integrity value, etc.) associated with the received beacon(s). For example, network devices 116a and 116b can receive, during a periodic probe/scan 115a, 115b, a beacon from another network device (e.g., network devices 116a and 116b). The beacon can comprise an identifier (e.g., identifier information 118) associated with the other network device (e.g., network devices 116a and 116b). The network devices 116a and 116b can determine that the beacon is associated with the other network device (e.g., network devices 116a and 116b) based on the identifier. The beacon can comprise a signal strength indicator (e.g., RSSI). The network devices 116a and 116b can determine a signal strength associated with the other network device (e.g., network devices 116a and 116b) based on a received signal strength indicator (RSSI) measurements associated with the other network device (e.g., network devices 116a and 116b). The network devices 116a and 116b can determine a baseline signal strength associated with the other network device (e.g., network devices 116a and 116b) based on/by measuring a received signal strength indicator (RSSI) associated with the other network device (e.g., network devices 116a and 116b). For example, during a probe/scan 115a, 115b (e.g., an initial probe/scan) of the network 105 to determine network devices in the network 105 (e.g., network device discovery, access point discovery, etc.) an initial list of network devices (e.g., network device 116, access points, etc.) in communication with the network 105 can be is generated by the network devices 116a and 116b. A received signal strength indication (RSSI) for each of the network devices (e.g., network devices 116a and 116b, access points, etc.) on/in the initial list can be measured and stored as a baseline signal strength associated with each of the network devices (e.g., network devices 116a and 116b). The initial list and/or any other related list (e.g., a list created based on a periodic probe/scan 115a, 115b of the network) can be stored by the network devices 116a and 116b or by another device. For example, the network devices 116a and 116b can transmit the initial list (or any other related list) to the computing device 104. The computing device 104 can receive initial lists (or any other related lists) from a plurality of network devices (e.g., network devices 116a and 116b) and generate/store/update a master list 130 comprising the received lists (or any other related lists). The list (e.g., initial list or any other related list) can be updated with new RSSI measurements associated with network devices (e.g., network devices 116a and 116b, access points, etc.) based on periodic probes/scans 115a, 115b of the network. The initial list, the master list 130, and/or any related list can comprise information (e.g., identifier information, identifier information 118, discovery information, provisioning information, etc.)

associated with the RSSI measurements/information determined from each of the network devices 116a and 116b.

The network devices 116a and 116b can detect a device, such as rogue device 117 (e.g., rogue hotspot, unauthorized access point, etc.), that is not authorized to provide communication to and/or be in communication with the network 105. For example, the rogue device 117 can be a device such as a smartphone, laptop, tablet, computer, mobile computing device, and the like, configured to mimic a network device (e.g., network devices 116a and 116b, authorized access point, etc.). The rogue device 117 can mimic a network device (e.g., network device 116a, authorized access point, etc.) by copying and broadcasting/transmitting a beacon comprising identifier information (e.g., identifier information 118) associated with the network device (e.g., network device 116a). For example, the rogue device 117 can mimic the network device 116a by copying identifier information 118 which comprises information such as a MAC address and/or SSID associated with the network device 116a and storing the identifier information 118. One or more devices (e.g., user device 102) can be in communication 125 with the rogue device 117 based on the identifier information 118 (e.g., copied identifier information) associated with the network device 116a. The one or more devices (e.g., user device 102) can be unaware that they are in communication with the rogue device 117 instead of a network device 116a. The network device 116b can determine/detect that the rogue device 117 is present in the network 105 based on one or more received signal strength indicators (RSSIs) associated with the network device 116b determined during a periodic probe/scan 115b.

The network devices 116a and 116b can determine/detect that the rogue device 117 is present in the network 105 based on one or more received signal strength indicators (RSSIs) received during a periodic probe/scan 115a and 115b of the network 105. The network devices 116a and 116b can periodically probe/scan 115a and 115b the network 105 for a time window (e.g., 20 microseconds). The network devices 116a and 116b can periodically probe/scan 115a and 115b the network 105 for a time widow/time period, such as of 20 microseconds, and determine information associated with the network 105 and or devices in communication with the network 105 (e.g., network devices 116a and 116b, rogue device 117, etc.). The network devices 116a and 116b can determine the information associated with the network 105 and or devices in communication with the network 105 based on information received during the time window. For example, the network devices 116a and 116b can periodically probe/scan 115a and 115b the network 105 for a time window of 20 microseconds and determine information associated with the network 105 and or devices in communication with the network 105 such as a value of a received signal strength indicator (RSSI).

The network devices 116a and 116b can determine, based on the RSSI value, if a device (e.g., network devices 116a and 116b) associated with the RSSI and/or identifier information is a device (e.g., network devices 116a and 116b) that should be associated with the RSSI and/or identifier information or a rogue device (e.g., rogue hotspot, unauthorized access point, etc.), such as rogue device 117. For example, the network devices 116a and 116b can determine from the periodic probe/scan 115a and 115b (e.g., an initial probing/scanning) of the network 105 that an RSSI associated with another network device (e.g., network devices 116a and 116b) is routinely and/or consistently 60 decibels (dB). A list initial list) of network devices (e.g., network devices 116a and 116b, authorized access points, etc.) can comprise information (e.g., discovery information, provisioning information, etc.) detailing that the RSSI associated with the other network device (e.g., network devices 116a and 116b) is routinely and/or consistently 60 dB.

The network devices 116a and 116b can determine that an RSSI associated with the other network device (e.g., network devices 116a and 116b) varies within a threshold from the information detailing that the RSSI associated with the other network device (e.g., network devices 116a and 116b) is routinely and/or consistently 60 dB (e.g., a baseline RSSI of 60 dB). For example, during a periodic probe/scan (e.g., periodic probe/scan 115a and 115b) of the network 105, the network devices (e.g., network devices 116a and 116b) can take/determine multiple RSSI measurements associated with the other network device (e.g., network devices 116a and 116b). The network device (e.g., network devices 116a and 116b) can determine that the multiple RSSI measurements associated with the other network device (e.g., network devices 116a and 116b) taken during the time window are of a certain value such as 59 dB, 58 dB, etc. The network devices (e.g., network devices 116a and 116b) can determine that the multiple RSSI measurements do not exceed a threshold variance from 60 dB. The threshold variance can be, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used.

The number of multiple RSSI measurements taken/determined can be manually provisioned. For example, the network devices 116a and 116b can be manually configured to take five RSSI measurements, ten RSSI measurements, twenty RSSI measurements, or any number of RSSI measurements during the time window. Additionally, the number of RSSI measurements taken/determined can be dynamically determined by the network devices 116a and 116b. For example, the network devices 116a and 116b can automatically determine any number of RSSI measurements to take/determine during the time window. A threshold variance value can be set at any value deviation from baseline signal strength, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used. Based on the multiple RSSI measurements not exceeding the threshold variance, the network devices 116a and 116b can determine that the other network device (e.g., network devices 116a and 116b) is not compromised. The other network device is not compromised if the identifier information associated with the other network device (e.g., network devices 116a and 116b) has not been copied (e.g., identifier information 119) by the rogue device 117. The network devices 116a and 116b can determine, based on the other network device not being compromised, that the rogue device 117 is not present in the network 105. The other network device is compromised if the identifier information associated with the other network device (e.g., network devices 116a and 116b) has been copied (e.g., identifier information 118) by the rogue device 117.

The rogue device 117 can be associated with an MST that is inconsistent in value, fluctuates, and/or exhibits erratic behavior during the time window. For example, the rogue device 117 can be associated with an RSSI that changes in value from 60 dB to 30 dB within a time widow associated with a periodic probe/scan 115a and 115b. The changes in value from 60 dB to 30 dB within the time widow can exceed a threshold variance from 60 dB. A threshold variance value can be set at any value deviation from baseline signal strength. The threshold variance can be, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like from the baseline signal strength. One of skill in the art will appreciate that other threshold variances can be used and can vary depending on what measurement is used. The network devices 116a and 116b can determine, based on the RSSI associated with the rogue device 117 not coinciding/reconciling with the information (e.g., discovery information, provisioning information, etc.) associated with the other network device (e.g., network devices 116a and 116b) stored in an initial list (or any other list), that the identifier information associated with the other network device (e.g., network device 116a) has been copied (e.g., identifier information 118) by the rogue device 117. The network devices 116a and 116b can determine, based on RSSI measurements exceeding the threshold variance, that the other network device is compromised. The other network device is compromised if the identifier information associated with the other network device (e.g., network devices 116a) has been copied (e.g., identifier information 118) by the rogue device 117.

The network devices 116a and 116b can store the identifier information associated with the other network device (e.g., network devices 116a and 116b) as compromised identifier information. The network devices 116a and 116b can transmit the identifier information associated with the other network device (e.g., network devices 116a and 116b) to another device, such as the computing device 104, for example. The computing device 104 and/or any other device can store (e.g., in database 114) the identifier information associated with the other network device 116 as compromised identifier information. The network devices 116a and 116b can transmit the compromised identifier information (e.g., identifier information 118) and/or any other information determined from a periodic probe/scan 115a and 115b to the computing device 104. The network devices 116a and 116b can transmit the compromised identifier information and/or any other information determined from a periodic probe/scan to the computing device 104 periodically (e.g., every hour, every day, etc.). The network devices 116a and 116b can transmit the compromised identifier information and/or any other information determined from a periodic probe/scan 115a and 115b to the computing device 104 to update the master list 130.

The computing device 104 can receive information (e.g., the compromised identifier information, identifier information 118) from the network devices 116a and 116b, the user device 102, and any other device. The computing device 104 can retrieve information (e.g., the identifier information 118, compromised identifier information, etc.) from and/or store information in the database 114 (e.g., the master list 130), such as RSSI information determined by network devices (e.g., network devices 116a and 116b) during a periodic probe/scan (e.g., periodic probe/scan 115a and 115b), identifier information (e.g., identifier information 118), combinations thereof, and the like. Any information can be stored in and retrieved from the database 114. The database 114 can be disposed remotely from the computing device 104 and accessed via direct or indirect connection. The database 114 can be integrated with the computing device 104 or some other device (e.g., network devices 116a and 116b) or system. The computing device may be configured as other devices, such as a user device (e.g., user device 102) or a network device (e.g., network devices 116a and 116b), for example.

The computing device 104 can receive the compromised identifier information (e.g., identifier information 118) from the network devices (e.g., network device 116b). The computing device 104 can store the compromised identifier information in a database (e.g., database 114) and/or generate/update a list (e.g., master list 130) comprising identifier information and/or compromised identifier information associated with a plurality of network devices network devices 116a and 116b).

The computing device 104 can determine that a compromised network device (e.g., network device 116a, compromised access point, etc.), and/or that a rogue device (e.g., rogue device 117, rogue hotspot, unauthorized access point, etc.), exists in the network 105. The computing device 104 can determine that a compromised network device and/or a rogue device exists in the network 105 based on information, such as signal strength information (e.g., measured signal strength information, RSSI information, etc . . . ) received from a plurality of authorized network devices (e.g., network devices 116a and 116b, authorized access points, etc . . . ). For example, each authorized network device of the plurality of authorized network devices can transmit/provide signal strength information determined during a periodic probe/scan (e.g., periodic probe/scan 115a and 115b) of the network 105 to the computing device 104. The computing device 104 can analyze the signal strength information received from each authorized network device of the plurality of authorized network devices to determine that a compromised network device and/or a rogue device exists in the network 105.

The computing device 104 can summate (e.g., average) signal strength information associated with a particular authorized network device that is received from multiple authorized network devices. The computing device 104 can determine that the signal strength information received from multiple authorized network devices is associated with the particular authorized network device based on network identifier information associated with the particular authorized network device received with the signal strength information from the multiple authorized network devices. The computing device 104 can determine a baseline signal strength associated with the particular authorized network device by summating (e.g., averaging) the signal strength information received from the multiple authorized network devices. For example, a first authorized network device can transmit signal strength information associated with the particular authorized network device that informs the computing device 104 that the signal strength associated with the particular authorized network device is 70 dB, and a second authorized network device can transmit signal strength information associated with the particular authorized network device that informs the computing device 104 that the signal strength associated with the particular authorized network device is 68 dB. The computing device 104 can summate or average the signal strength information received from the first authorized network device and the signal strength information received from the second authorized network device to determine that a baseline signal strength associated with the particular authorized network device is 69 dB (e.g., an average of 70 dB and 68 dB).

The computing device 104 can determine whether the particular authorized network device is compromised based on a difference between the baseline signal strength associated with the particular authorized network device and subsequent signal strength measurements associated with the particular authorized network device received from the multiple authorized network devices (e.g., the first authorized network device, and the second authorized network device). If the difference between the baseline signal strength associated with the particular authorized network device and a summation or an average of the subsequent signal strength measurements associated with the particular authorized network device received from the multiple authorized network devices does not exceed a threshold variance from 69 dB, then the computing device 104 can determine that the particular authorized network device is not compromised. If the difference between the baseline signal strength associated with the particular authorized network device and a summation or an average of the subsequent signal strength measurements associated with the particular authorized network device received from the multiple authorized network devices exceed a threshold variance from 69 dB, then the computing device 104 can determine that the particular authorized network device is compromised. The threshold variance can be, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used.

Additionally, the computing device 104 can determine that a compromised network device (e.g., network device 116a, compromised access point, etc.) and/or that a rogue device (e.g., rogue device 117, rogue hotspot, unauthorized access point, etc. exist in the network 105 based on information, such as signal strength information (e.g., measured signal strength information, RSSI information, etc . . . ) received from a single authorized network device (e.g., network device 116b, etc . . . ). For example, the authorized network device can transmit/provide signal strength information determined during a periodic probe/scan (e.g., periodic probe/scan 115b) of the network 105 to the computing device 104. The computing device 104 can analyze the signal strength information received from the authorized network device to determine that a compromised network device and/or a rogue device exist in the network 105.

The computing device 104 can receive signal strength information associated with a particular authorized network device from the authorized network device. The computing device 104 can determine that the signal strength information received from the authorized network device is associated with the particular authorized network device based on network identifier information associated with the particular authorized network device received with the signal strength information from the authorized network device. The computing device 104 can store the signal strength information associated with a particular authorized network device received from the authorized network device as a baseline signal strength associated with the particular authorized network device.

The computing device 104 can determine whether the particular authorized network device is compromised based on a difference between the baseline signal strength associated with the particular authorized network device and subsequent signal strength measurements associated with the particular authorized network device received from the authorized network device. If the difference between the baseline signal strength associated with the particular authorized network device and subsequent signal strength measurements associated with the particular authorized network received from the authorized network device does not exceed a threshold variance, then the computing device 104 can determine that the particular authorized network device is not compromised. If the difference between the baseline signal strength associated with the particular authorized network device and subsequent signal strength measurements associated with the particular authorized network received from the authorized network device exceeds a threshold variance, then the computing device 104 can determine that the particular authorized network device is compromised. The threshold variance can be, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB 23 dB, 24 dB, 25 dB, and the like. One of skill in the art will appreciate that other threshold variances can be used and can vary depending on what measurement is used.

Based on a determination that a compromised network device (e.g., network device 116a, compromised access point, etc.) and/or that a rogue device (e.g., rogue device 117, rogue hotspot, unauthorized access point, etc.) exist in the network 105, actions can be taken to neutralize the effect the unauthorized access point in the network 105. Information (e.g., a message, code, etc.) can be sent to the to the compromised network device (e.g., network device 116a) that causes the compromised network device to deauthenticate/disassociate devices (e.g., user device 102, mobile devices, network devices, etc. in communication and/or associated with the compromised access point. The message can be sent by a device such as the computing device 104, the network device 116a, the network device, 116b, combinations thereof, and the like. For example, a message (e.g., a deuthentication frame, etc.) can be sent to the compromised network device (e.g., network device 116a) that causes the compromised network device to deauthenticate/disassociate devices in communication (e.g., communication 125) and/or associated with the compromised network device based on identifier information (e.g., identifier information 118). Information (e.g., a message, code, etc. can be sent to the to the compromised network device (e.g., network device 116a) that causes the compromised network device to change/modify its identifier information (e.g., identifier information 118). For example, a message can be sent to the compromised network device (e.g., network device 116a) that causes the compromised network device to change identifier information (e.g., identifier information 118) to which it is associated with to a new identifier information (e.g., a new SSID, a new MAC address, etc.). The rogue device (e.g., rogue device 117, rogue hotspot, unauthorized access point, etc.) will be unaware of the new identifier information. For example, the rogue device will be unaware of the new SSID and/or MAC address associated with the previously compromised network device (e.g., network device 116a) that is now (again) an authorized network device based on the new identifier information. Devices (e.g., user device 102) that were previously connected to/in communication with the previously compromised network device (e.g., network device 116a) can reconnect, re-associate with, and/or be in communication with the previously compromised network device that is now (again), based on the new identifier information, an authorized network device.

FIG. 2 is an example system in which the present methods and systems can operate. The system details the effect of a rogue access point (e.g., rogue device 117, rogue hotspot, unauthorized access point, illegitimate access point, untrusted access point, etc.) on received signal strength indicators (RSSIs) associated with a plurality of access points (e.g., network devices 116a and 116b, authorized access points, legitimate access points, trusted access points, etc.). A system 200 can comprise access points 201, 202, and 203 and a rogue access point 204. Any of the steps, methods, actions, and the like performed by the access point 201 can be performed by the access point 202 and/or the access point 203. Any of the steps, methods, actions, and the like performed by access point 202 can be performed by the access point 201 and/or the access point 203. Any of the steps, methods, actions, or the like performed by the access point 203 can be performed by the access point 201 and/or access point 202.

The access point 201 can periodically and/or consistently transmit/broadcast a beacon comprising identifier information (e.g., identifier information 118, identifier information 119, etc.) such as a media access control (MAC) address, service set identifier (SSID) information, combinations thereof, and the like, for example. The access point 201 can receive a one or more beacons 205, and 206 from the access points 202 and 203, respectively. The access point 201 can transmit/broadcast a beacon (e.g., 205 and 206) comprising identifier information (e.g., identifier information 118, identifier information 119, etc.) such as a MAC address (e.g., MAC address 00:00:01), service set identifier (SSID) information (not shown), combinations thereof, and the like associated with the access point 201 that is received by one or more of the access point 202, the access point 203, combinations thereof, and the like. The access point 202 can transmit/broadcast a beacon (e.g., 205) comprising identifier information such as a MAC address (e.g., MAC address 00:00:02), service set identifier (SSID) information (not shown), combinations thereof, and the like associated with the access point 202 that is received by one or more of the access point 201, the access point 203, combinations thereof, and the like. The access point 203 can transmit/broadcast a beacon (e.g., 205 and 207) comprising identifier information such as a MAC address (e.g., MAC address 00:00:03), service set identifier (SSID) information (not shown), combinations thereof, and the like associated with access point 203 that is received by one or more of the access point 201, the access point 202, combinations thereof, and the like.

The access points 201, 202, and 203 can receive the beacons (e.g., 205, 206, and 207) during periodic probes/scans (e.g., periodic probes/scans 115a and 115b) of the system 200. Each of the beacons (e.g., 205, 206, and 207) can comprise and/or be associated with a received signal strength indicator (RSSI). The access points 201, 202, and 203 can measure/determine a value of each RSSI associated with each beacon received. For example, the access point 201 can perform a periodic probe/scan of the system 200 to determine/detect the presence access points 202 and 203 based in a RSSI value determined from the beacons (e.g., 206 and 205) received from the access points 202 and 203, respectively. For example, the access point 201 can periodically probe/scan the system 200 for a time window (e.g., 20 microseconds) and determine/measure multiple RSSI values then sum and/or average multiple RSSI values received from the access points 202 and 203 as the beacons 206 and 205, respectively and determine baseline RSSI values associated with the access point 202 and access point 203.

The access point 201 can determine a baseline RSSI value of 60 (e.g., 60 decibels) associated with the access point 202 based on one or more beacons (e.g., beacon 206) received from the access point 202 during the time window. The access point 201 can determine that the one or more beacons (e.g., beacon 206) received during the time window are associated with/from the access point 202 based on identifier information such as MAC address 00:00:02, identifier information 118, service set identifier (SSID) information, combinations thereof, and the like associated with the access point 202 and received along with the one or more beacons. The access point 201 can determine a baseline RSSI value of 70 (e.g., 70 decibels) associated with the access point 203 based on one or more beacons (e.g., beacon 205) received from the access point 202 during the time window. The access point 201 can determine that the one or more beacons (e.g., beacon 205) received during the time window are associated with/from access point 203 based on identifier information such as MAC address 00:00:03, identifier information 118, service set identifier (SSID) information, combinations thereof, and the like associated with the access point 203 and received along with the one or more beacons. The access point 201 can store the identifier information associated with access point 202 and access point 203 along with the respective baseline RSSI values associated with the access point 202 and the access point 203 as a list/table 208 in order to track access points in communication with the system 200. The access point 201 can transmit the list/table 208 to another device (e.g., computing device 104) to store be stored by the device in a database (e.g., database 114) and/or list (e.g., master list 130) associated with access points. Access point 202 and access point 203 can create/generate a similar list/table as the list/table 208 in the same manner as described for access point 202. For example, access point 202 can create/generate a similar list/table 209 and the access point 203 can create/generate a similar list/table 210.

The access point 201 can determine that an RSSI value associated with access point 202 varies within a threshold from the baseline RSSI value (e.g., RSSI=60) associated with access point 202 received with beacon(s) 205. For example, during a periodic probe/scan access point 201 can determine multiple RSSI measurements associated with the access point 202 during the time window are values, such as 59 dB, 58 dB, etc. and determine that the multiple RSSI measurements do not exceed a threshold variance from 60 dB. The number of multiple RSSI measurements taken/determined can be manually provisioned. For example, the access point 201 can be manually configured to take 5, 10, 20, or any number of RSSI measurements during the time window. The number of RSSI measurements taken/determined can be dynamically determined by the access point 201. For example, the access point 201 can automatically determine any number of RSSI measurements to take/determine during the time window. A threshold variance value can be set at any suitable value, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used. Based on the multiple RSSI measurements not exceeding the threshold variance, the access point 201 can determine that the access point 202 is not compromised. The access point 202 is not compromised if the identifier information associated with the access point 201 (e.g., MAC address 00:00:02) has not been copied by another device (e.g., rogue access point 204, rogue device 117, rogue hotspot, unauthorized access point, etc.).

During a probe/scan of the system 202, the access point 201 can determine that an RSSI value associated with access point 203 varies within a threshold from the baseline RSSI value (e.g., RSSI=70) associated with access point 203 received with beacon(s) 206. For example, during the probe/scan access point 201 can determine multiple RSSI measurements associated with the access point 203 during the time window are values, such as 69 dB, 68 dB, etc. and determine that the multiple RSSI measurements do not exceed a threshold variance from 70 dB. A threshold variance value can be set at any suitable value, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used.

During a subsequent probe/scan of the system 202, the access point 201 can determine that an RSSI value associated with access point 203 exceeds the variance threshold. RSSI readings (e.g., the baseline RSSI) associated with the access point 203 can be steady and/or consistent, such as a RSSI value of 70, for example. The system 200 can comprise the rogue access point 204. The rogue access point 204 may not be an actual access point. The rogue access point 204 can be a device (e.g., rogue device 117, smartphone, laptop, tablet, computer, mobile computing device, etc.) set up by malicious entity that copies and/or assigns similar identifier information (e.g., MAC address 00:00:03, identifier information 118, service set identifier (SSID) information, copied identifier information 119) as an access point (e.g., access point 203). The rogue access point 204 can be set up by the malicious entity to obtain sensitive information (e.g., user information, personal information, credit card information, login credentials, etc.) associated with a device (e.g., user device 102) in communication with the access point 203. The rogue access point 204 can be set up by the malicious entity to take other negative actions (e.g., malware installation) that harm the device (e.g., user device 102). The copied identifier information can comprise information such the MAC address (e.g., MAC address 00:00:03) and service set identifier (SSID) associated with the access point 203. The rogue access point 204 can periodically and/or consistently transmit/broadcast one or more beacons 208 comprising the copied identifier information (e.g., identifier information 118) and a received signal strength indicator (RSSI). The access point 201 can receive the one or more beacons 206 and the one or more beacons 207 during the probe/scan of the system 200.

The access point 201 can determine that the multiple RSSI measurements associated with the beacons 206 and 207 which comprise identifier information associated with the access point 203 (e.g., MAC address 00:00:03) that has been copied by the rogue access point 204 (e.g., MAC address 00:00:03) and received during the time window, are values, are of a certain value. The access point 201 can determine that the multiple RSSI measurements associated with the beacons 206 and 207 are values such as 30 dB (e.g., received from rogue access point 204) and 70 dB (e.g., received from access point 203). The access point 201 can determine that collectively, the multiple RSSI measurements from the beacons 206 and 208 exceed a threshold variance from 70 dB (e.g., the baseline RSSI value associated with access point 203). The access point 201, based on the beacons 206 and 208 comprising similar identifier information (e.g., MAC address 00:00:03), may be unaware that the beacons 206 and 208 are from two different devices (e.g., access point 203 and rogue access point 204) rather than a single device (e.g., access point 203). However, the access point 201 can determine, based on the collective RSSI measurements received/determined from the beacons 206 and 203 that the identifier information (e.g., MAC address 00:00:03) is compromised. The identifier information (e.g., MAC address 00:00:03) can be compromised if it is copied by a device such as the rogue access point 204, for example. As such, the access point 201 can determine that the rogue access point 204 is present in the system 200 and that access point 203 is now a compromised access point (e.g., an access point associated with identifier information that has been copied by a rogue access point)

FIG. 3 shows an example system in which the present methods and systems can operate. A system 300 can comprise access point 301 and access point 302 (e.g., authorized access points, network devices 116a and 116b, access points 201-203, etc.). The access points can be in communication with a network 303 (e.g., network 105, system 200, etc.). The network 303 can The network 105 can comprise one or more networks, such as a wide area network (e.g., a content network, service network, provider network, the Internet), a public network, an open network, a provider managed network, a non-user managed network, a provider controlled network, a non-user controlled network, a local network, a private network, a closed network, a user managed network, a user controlled network, a user deployed network, and/or the like. Other forms of communications can be used, such as wired and wireless telecommunication channels, for example. The access point 301 and the access point 302 can enable a device, such as the user device 304 (e.g., user device 102) to be in communication with the network 303. For example, the access point 301 can be configured with connection/identifier information (e.g., SSID 123, and MAC address 00:00:03) to enable the user device 304 to be in communication 310 with the access point 301. The user device 304 can be in communication with the network 303 via the access point 301.

An access point in communication with the network 303 can determine the presence of another access point in communication with the network 303. For example, access point 301 can determine the presence of access point 302 in the network 303 and access point 302 can determine the presence of access point 301 in the network 303. Any of the steps, methods, actions, and the like performed by an access point in communication with the network 303 can be performed by another access point in communication with the network 303. For example, any steps, methods, actions, and the like performed by access point 301 can be performed by 302 and vice versa. The access point 301 can periodically and/or consistently transmit/broadcast a beacon 308 comprising identifier information such as a MAC address (e.g., MAC address 00:00:03), SSID information (e.g., SSID 123), combinations thereof, and the like, for example. The access point 302 can receive the beacon 308 from the access point 301. The access point 302 can received the beacon 308 during periodic probes and/or scans of the network 303.

The beacon 308 can comprise and/or be associated with a received signal strength indicator (RSSI). The access point 302 can measure/determine a value of the RSSI associated with the beacon 308. The access point 302 can perform a periodic probe/scan of the network 303 to determine/detect the presence of the access point 301 based in a RSSI value determined from the beacon 308. The access point 302 can periodically probe/scan the network 303 for a time window. For example, the access point 302 can periodically probe/scan the network 303 for a time window of 20 microseconds. The access point 302 can determine/take multiple RSSI measurements during the time window. For, example, the access point 302 can measure a RSSI associated with beacon 308 at regular intervals (e.g., 5 microsecond intervals), such as at 5 microseconds, 10 microseconds, 15 microseconds, and 20 microseconds. The number of multiple RSSI measurements taken/determined by the access point 302 can be manually provisioned. For example, the access point 302 can be manually configured to take 5, 10, 20, or any number of RSSI measurements during the time window. The number of multiple RSSI measurements taken/determined can be dynamically determined by the access point 302. For example, the access point 302 can automatically determine any number of RSSI measurements to take/determine during the time window.

The access point 302 can sum and/or average multiple RSSI values and determine a baseline RSSI value. For example, the access point 302 can sum and/or average the multiple RSSI values determined at the regular intervals during the time window and determine that a baseline RSSI value associated with access point 301 is 70 (e.g., 70 dB). The access point 302 can store the identifier information (e.g., MAC address, SSID) associated with access point 301 with the determined baseline RSSI value. The access point 302 can transmit the identifier information (e.g., MAC address, SSID) associated with access point 301 with the determined baseline RSSI value to the computing device 306 (e.g., computing device 104, server, cloud-based device, etc.). The computing device 306 can receive identifier information and baseline RSSI values from a plurality of access points (e.g., access point 301, access point 302). The computing device 306 can store the identifier information and baseline RSSI values received from the access points as a master list (e.g., master list 130) comprising identifier information and baseline RSSI values associated with a plurality of devices in communication with the network 303.

The access point 302 can determine that the identifier information (e.g., MAC address 00:00:03, SSID 123) associated with the access point 301 is compromised. The identifier information can be compromised if the identifier information has been copied (e.g., copied identifier information 119) by a rogue hotspot 305. The rogue hotspot 305 can be a device (e.g., rogue device 117, rogue access point 204, unauthorized access point, laptop, etc.) set up by malicious entity that copies and/or assigns similar identifier information as the access point 301. The rogue hotspot 305 can to trick, based on the copied identifier information associated with access point 301, the user device 304 into being in communication 311 with the network 303 via the rogue hotspot 305. The user device 304 can be unaware that it is in communication 311 with the network 303 via the rogue hotspot 305 instead of in communication 310 with the network 303 via the access point 301.

The rogue hotspot 305 can obtain sensitive information associated with the user device 304 and/or harm the user device 304, such as harm caused by malware installed on the user device 304 by the rogue hotspot 305, for example. The access point 302 can determine that the identifier information (e.g., MAC address 00:00:03, SSID 123) associated with the access point 301 is compromised based on a threshold number of the determined/monitored signal strengths (e.g., RSSI received during a periodic probe/scan) exceeding a variance threshold associated with the baseline signal strength associated with the access point 301.

The access point 302 can detect the rogue hotspot 305 (e.g., determine that the identifier information (e.g., MAC address 00:00:03, SSID 123) associated with the access point 301 is compromised) during a periodic probe/scan of the network 303. During a periodic probe/scan of the network 303 the access point 302 can measure multiple RSSIs associated with the access point 301 during a time window. The access point 302 can determine that the multiple RSSIs are associated with the access point 301 based identifier information (e.g., MAC address 00:00:03, SSID 123). The access point 302, based on the identifier information, can access the stored information comprising the identifier information associated with the access point 301, and determine that the multiple RSSIs associated with the access point 301, determined during the time window, exceed a threshold variance from the baseline signal strength associated with the access point 301. For example, the access point 301 can access a database (e.g., database 114) comprising the identifier information associated with the access point 301 and determine that the baseline signal strength associated with the access point 301 is 70 dB. The RSSI measurements associated with the access point 301, determined during the time window, can vary in value, such as from 30 dB to 70 dB.

The signal strength (e.g., RSSI) measurements associated with the network device determined during the time window can be vary in value, such as from 30 dB to 70 dB, because the access point 302 can receive and measure signal strength (e.g., RSSI) from a beacon 308 that is broadcast/transmitted by the access point 301 and a beacon 309 that is broadcast/transmitted by the rogue hotspot 305. For example, the rogue hotspot 305 can copy the identifier information (e.g., MAC address 00:00:03, SSID 123, etc.) associated with the access point 301 and periodically and/or consistently transmit/broadcast the beacon 309 comprising the copied identifier information. The beacon transmitted/broadcast by the rogue hotspot 305 can be associated with a RSSI value of 30 dB. During a periodic probe/scan of the network 303, the access point 302 can receive the beacon 308 and the beacon 309 from the access point 301 and rogue hotspot 305, respectively. The access point 302 may inaccurately determine that the beacon 308 and the beacon 309 originate from a single device (e.g., the access point 301) based on the identifier information (e.g., MAC address 00:00:03, SSID 123) broadcast by access point 301 and the copied identifier information (e.g., MAC address 00:00:03, SSID 123) broadcast by the rogue hotspot 305 matching and/or being similar.

The rogue hotspot 305 can be associated with a signal strength (e.g., RSSI) that is inconsistent in value, fluctuates, and/or exhibits erratic behavior during a time window associated with a periodic scan performed by the access point 302. From the perspective of the access point 302, the beacon 309 will vary in value (e.g., flap) from 70 dB to 30 dB as the access point receives beacons from the rogue device 305 and the access point 301.

The changes in signal strength (e.g. RSSI value) within the time widow can exceed a threshold variance from 70 dB. A threshold variance value can be set at any suitable value, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used. The access point 302 can determine that the identifier information associated with the access point 301 is compromised based on a number of the determined/monitored signal strengths exceeding the variance threshold associated with the baseline signal strength of 70 dB. The access point 302 can store the identifier information as compromised identifier information. The access point 302 can transmit the compromised identifier information to the computing device 306. The computing device 306 can store the compromised identifier information in the master list (e.g., master list 130). The master list can comprise identifier information associated with a plurality of access points and/or compromised identifier information associated with a plurality of access points.

Based on receiving the compromised identifier information, the computing device 306 can transmit a message to the access point 301. The computing device 306 can transmit information (e.g., a message, code, deauthentication frame, etc.) to the access point 301 that causes the access point 301 to deauthenticate/disassociate the user device 304. As such, the user device 304 will be unable to be in communication 310 with the network 303 via the access point 301 based on the compromised identifier information (e.g., MAC address 00:00:03, SSID 123). The computing device 306 can transmit information (e.g., a message, code, etc.) to the access point 301 that causes the access point 301 to authenticate/associate the user device 304 based on new identifier information (e.g., MAC address 00:00:04, SSID 456). As such, the user device 304 will be able to be in communication 312 with the network 303 via the access point 301 based on the new identifier information (e.g., MAC address 00:00:04, SSID 456).

FIG. 4 is a flowchart of an example method. The method can detect rogue hotspots (e.g., rogue device 117, rogue access point 204, unauthorized access points, etc.). For example an authorized (e.g., legitimate, trusted, etc.) access point (e.g., network devices 116a and 116b, access points 201-203, access points 301-302) can detect rogue hotspots.

At 402, a device network devices 116a and 116b, access points 201-203, access points 301-302, computing device 104, etc. can determine a baseline signal strength associated with a network device (e.g., authorized access point, network devices 116a and 116b, access points 201-203, access points 301-302). The network device can periodically transmit and/or broadcast a beacon comprising identifier information (e.g., a MAC address, SSID, an identifier, identifier information 118, and identifier information 119) and/or a signal strength value associated with the network device. The device can determine a baseline signal strength value associated with the network device based on/by measuring signal strengths (e.g., RSSIs) associated with the network device. For example, during an probe/scan of a network (e.g., network 105, system 200, network 303) to determine other devices (e.g., network devices) in the network, an initial list of network devices (e.g., authorized access points, network devices 116a and 116b, access points 201-203, access points 301-302, etc.) in communication with the network can be is generated by the device. The device can receive the beacon and multiple signal strength measurements (e.g., RSSIs) associated with the network device can be determined and/or measured. An average and/or summation of determined/measured signal strengths (RSSI) can be stored as a baseline signal strength associated with the network device. For example, multiple received signal strength indications (RSSIs) with a value of 60 (e.g., 60 dB) associated with the network device can be measured and/or received by the device and stored as baseline signal strength (e.g., 60 dB) associated with the network device.

The initial list can be stored by the device or by another device. For example, the device can transmit the initial list (or any other generated list such as a list generated by subsequent probes/scans of the network) to a server and/or computing device (e.g., the computing device 104, computing device 306, cloud-based device, etc.). The server and/or computing device can receive initial lists (or any other lists) from a plurality of devices (e.g., network devices 116a and 116b, access points 201-203, access points 301-302) and generate/store a master list (e.g., master list 130) comprising the received initial lists. The initial lists can be updated with new RSSI measurements associated with network devices (e.g., authorized access points, network devices 116a and 116b, access points 201-203, access points 301-302, etc.) based on subsequent probes/scans by the device. The initial list and/or the master list (e.g., master list 130) can comprise the identifier information associated with the network device, identifier information associated with other network devices, and RSSI information determined from the network device and/or other network devices.

At 404, the device can determine/monitor a signal strength associated with the network identifier information. The device can periodically probe/scan the network for a time window. The device can periodically probe/scan the network for a time window and measure/determine a signal strength associated with the network identifier based beacons transmitted and/or broadcasted by the network device comprising the identifier information and/or a signal strength value (e.g., RSSI) associated with the network device. For example, the device can probe/scan the network for a time window of 20 microseconds and received one or more beacons from the network device during the time window. The one or more beacons can comprise an RSSI value (e.g., decibel value, amplitude value, power value, etc.) associated with the network device. The device can associate the RSSI values with the network device based on identifier information within each beacon received. Additionally, the one or more beacons can inform the device that a signal strength associated with the network device was and/or is provisioned at a certain value (e.g., decibel value, amplitude value, power value, etc.). Further, the provisioned value of the signal strength associated with the network device can be a baseline (e.g., consistent, regular, routine, etc.) signal strength associated with the network device.

At 406, the device can determine that the identifier information associated with the network device is compromised. The identifier information associated with the network device can be compromised if the identifier information associated with the network device has been copied by a rogue hotspot (e.g., rogue device 117, rogue access point 204, unauthorized access points, etc.). The device can determine that the identifier information associated with the network device is compromised based on a threshold quantity/number of the determined/monitored signal strengths (e.g., RSSI received during a periodic probe/scan) exceeding a variance threshold associated with the baseline signal strength associated with the network device. During a periodic probe/scan of the network the device can measure multiple RSSIs associated with the network device during a time window. The device can determine that the multiple RSSIs are associated with the network device based on associated identifier information. The device, based on the identifier information, can access the initial list and/or the master list (e.g., master list 130) comprising the identifier information associated with the network device, and determine that the multiple RSSIs associated with the network device determined during the time window exceed a threshold variance from the baseline signal strength associated with the network device. For example, the device can access the initial list and/or the master list (e.g., master list 130) comprising the identifier information associated with the network device and determine that the baseline signal strength associated with the network device is 70 dB. The multiple RSSIs associated with the network device determined during the time window can be values such as 69 dB, 30 dB, 68 dB, 31 dB etc.

The RSSIs associated with the network device determined during the time window can be values such as 69 dB, 30 dB, 68 dB, 31 dB etc. because a rogue hotspot (e.g., rogue device 117, rogue access point 204, unauthorized access points, etc.) may be present in the network. The rogue hotspot (e.g., rogue device 117, rogue access point 204, unauthorized access points, etc.) can be a device set up by a malicious entity that copies and/or assigns similar identifier information (e.g., identifier information 118, identifier information 119, MAC address, SSID) as the network device. For example, the rogue hotspot can copy the identifier information associated with the network device and periodically and/or consistently transmit/broadcast one or more beacons comprising the copied identifier information. The one or more beacons transmitted/broadcast by the rogue hotspot can be associated with a RSSI value (e.g., 30 dB). During a periodic probe/scan of the network, the device can received beacons from the network device and the rogue hotspot. The device may perceive/determine the beacons as originating from a single device (e.g., the network device) based on the identifier information and copied identifier information matching and/or being similar. The rogue hotspot can be associated with an RSSI that is inconsistent in value, fluctuates, and/or exhibits erratic behavior during a time window associated with a periodic scan performed by the device. For example, the rogue hotspot can be associated with an RSSI values that range from 70 dB to 30 dB within the time widow associated with the periodic probe/scan. The device can determine RSSI values during the time window to be values such as 69 dB, 30 dB, 68 dB, 31 dB, and the like, because the network device and the rogue hotspot are both transmitting/broadcasting RSSIs associated with the identifier information that are received by the device.

The changes in value 69 dB, 30 dB, 68 dB, 31 dB) within the time widow can exceed a threshold variance from 70 dB. A threshold variance value can be set at any suitable value, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used. The device can determine that the identifier information associated with the network device is compromised based on a quantity/number of the determined/monitored signal strengths (RSSIs) exceeding the variance threshold associated with the baseline signal strength of 70 dB. The device can store the identifier information associated with the network device as a compromised identifier and/or compromised identifier information.

At 408, the device can transmit an indication of the compromised identifier. For example, the device can transmit the compromised identifier information to the server and/or computing device (e.g., computing device 104, computing device 306, cloud-based device, etc.). The server and/or computing device can store the compromised identifier information in the master list (e.g., master list 130). The master list can comprise identifier information associated with a plurality of network devices and/or compromised identifier information associated with a plurality of network devices.

FIG. 5 is a flowchart of an example method. At 502, a computing device (e.g., computing device 104, computing device 306, server, cloud-based device, etc.) can receive information associated with signal strength from a plurality of network devices (e.g., authorized access points, network devices 116a and 116b, access points 201-203, access points 301-302, etc.) in a network (e.g., network 105, network 303). Each of the plurality of network devices can determine a signal strength associated with other network devices in the network by measuring a signal strength (RSSI) and/or determining a signal strength value (e.g., decibel value, amplitude value, power value, integrity value, etc.) associated with beacon(s) received from the other network devices. For example, a network device of the plurality of network devices can receive, during a periodic probe/scan of the network, one or more beacons from other network devices. The beacons can comprise identifier information (e.g., identifier information 118, identifier information 119, MAC address, SSID, etc.) associated with the other network devices. The network device can determine that the beacons are associated with each of the other network devices based on the identifier information. The beacons can comprise signal strength indicators (e.g., RSSIs). The network device can determine signal strengths associated with each of the other network devices by measuring a value to the RSSIs. The network device can determine a baseline signal strength associated with each of the other network devices by measuring the value to the RSSIs received. For example, during an initial probe/scan of the network to determine other network devices in the network (e.g., network device discovery, access point discovery, etc.) an initial list of the other network devices (e.g., authorized access points, network devices 116a and 116b, access points 201-203, access points 301-302, etc.) in communication with the network can be is generated (e.g., obtained by probe/scan) by the network device. A RSSI value (e.g., 60 dB) for each of the other network devices can be measured and stored as a baseline signal strength associated with each of the other network devices. The network device can store the initial list or another device such as the computing device can store the initial list. For example, the network device can transmit the initial list (or any other list) to the computing device. The computing device can receive initial lists (e.g., information associated with signal strength) from each of the plurality of network devices.

At 504, the computing device can generate a master list comprising identifier information and information associated with signal strength associated with each of the plurality of network devices. For example, the computing device can receive the initial lists from each of the plurality of network devices and store the initial lists as a master list (e.g., mater list 130). The master list can be updated with new RSSI measurements associated each of the plurality of network devices based on subsequent probes/scans of the network performed by each of the plurality of network devices.

At 506, the computing device can receive information associated with a compromised identifier. The compromised identifier can be associated with a network device of the plurality of network devices. The information associated with the compromised identifier can be received from one or more network devices of the plurality of network devices. For example, a network device can determine that identifier information associated with another network device is compromised. The identifier information can be compromised if the identifier information has been copied by a rogue hotspot (e.g., rogue device 117, rogue access point 204, unauthorized access points, etc.). The network device of the plurality of network devices can determine that identifier information associated with another network device is compromised based on a threshold quantity/number of the determined/monitored signal strengths exceeding a variance threshold associated with the baseline signal strength associated with the other network device. For example, during a periodic probe/scan of the network the network device can measure multiple RSSIs associated with other network devices during a time window. The network device can determine that the multiple RSSIs are associated with the other devices based on associated identifier information. The network device, based on the identifier information, can access stored information such as list of network devices that comprises baseline signal strength information associated with each of the plurality of network devices. The network device can access the initial list determine that the baseline signal strength associated another device is 70 dB. The network device can determine that measured multiple RSSIs associated with another network device are values such as 69 dB, 30 dB, 68 dB, 31 dB etc.

The measured multiple RSSIs associated with another network device can be values such as 69 dB, 30 dB, 68 dB, 31 dB etc. because a rogue hotspot may be present in the network. The rogue hotspot (e.g., rogue device 117, rogue access point 204, unauthorized access points, etc.) can be a device such as a smartphone, laptop, tablet, computer, mobile computing device, and the like, set up by malicious entity to copy and/or assign similar identifier information (e.g., identifier information 118, identifier information 119, MAC address, SSID) as another network device. For example, the rogue hotspot can copy the identifier information associated with another network device and periodically and/or consistently transmit/broadcast one or more beacons comprising the copied identifier information. The one or more beacons transmitted/broadcast by the rogue hotspot can be associated with a RSSI value (e.g., 30 dB).

During a periodic probe/scan of the network, the network device of the plurality of network devices can receive beacons from both another network device and the rogue hotspot. The network device may perceive/determine the beacons as originating from a single device (e.g., another network device) based on the identifier information (e.g., identifier information associated with another device) and the copied identifier information e.g., identifier information copied by the rogue hotspot) matching and/or being similar. The rogue hotspot can be associated with an RSSI that is inconsistent in value, fluctuates, and/or exhibits erratic behavior during a time window associated with a periodic scan performed by the network device. For example, the rogue hotspot can be associated with an RSSI values that range from 70 dB to 30 dB within the time widow associated with the periodic probe/scan. As such, the network device can determine RSSI values during the time window to be values such as 69 dB, 30 dB, 68 dB, 31 dB etc. The changes in value (e.g., 69 dB, 30 dB, 68 dB, 31 dB) within the time widow can exceed a threshold variance from 70 dB. A threshold variance value can be set at any suitable value, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used. The network device can determine, based on the RSSI associated with the rogue device not coinciding/reconciling with the baseline RSSI associated with another network device (e.g., the RSSI measurements exceeding the threshold variance), that the other network device is compromised. The network device is compromised if identifier information associated with network device has been copied (e.g., identifier information 118) by a rogue hotspot. The network device can transmit information associated with a compromised identifier to the computing device. The computing device can receive the information associated with a compromised identifier.

At 508, the computing device can use the information associated with the compromised identifier to update the master list (e.g., master list 130). As such, the master list can comprise identifier information for each of the plurality of network devices in the network and compromised identifier information for each of the plurality of network devices in the network that are associated with identifier information that has been copied by a rogue hotspot.

At 510, the computing device can transmit a message (e.g., information) to the network device associated with the identifier information that has been compromised (e.g., copied by a rogue hotspot). The computing device can transmit a message/information (e.g., a code, deauthentication frame, etc.) to the network device that causes the network device to deauthenticate/disassociate devices (e.g., user device 102, user device 304, mobile devices, network devices, etc.) in communication and/or associated with the network device based on the copied identifier information (e.g., identifier information copied by a rogue hotspot).

The computing device can transmit a message/information (e.g., a code, etc.) to the network device (e.g., the network device associated with the identifier information that was copied by the rogue hotspot) that that causes the network device to change/modify its associated identifier information. For example, a message can be sent to the network device that causes the network device to change a SSID and/or MAC address to which it is associated with to a new SSID and/or MAC address. The rogue hotspot will be unaware of the new identifier information. For example, the rogue hotspot will be unaware of the new SSID and/or MAC address associated with the network device. Devices that were previously connected to/in communication with the network device can reconnect, re-associate with, and/or be in communication with the network device based on the new identifier information.

FIG. 6 is a flowchart of an example method. At 602, an expected signal strength can be received. The expected signal strength can be received from a first network device (e.g., network devices 116a and 116b, access points 201-203, access points 301-302, authorized access point, etc . . . ). The expected signal strength can be received by a device (e.g., network devices 116a and 116b, access points 201-203, access points 301-302, authorized access point, computing device 104, remote computing device, etc . . . ). The expected signal strength can be associated with a second network device (e.g., network devices 116a and 116b, access points 201-203, access points 301-302, authorized access point, etc . . . ). The expected signal strength can be a manually provisioned signal strength. For example, the first network device may be manually provisioned during an initial network deployment, network discovery/set-up, network arrangement, and the like. The expected signal strength can be a dynamically determined signal strength. The expected signal strength can be determined by the first network device during a probe/scan of a network (e.g., network 105) where the first network device measures a signal strength (e.g., received signal strength, RSSI, etc . . . ) associated with the second network device for a duration/time window. For example, the first network device can probe/scan the network for a time window of 20 microseconds and receive one or more beacons from the second network device during the time window. The one or more beacons can comprise an RSSI value (e.g., decibel value, amplitude value, power value, etc.) associated with the second network device. The first device can associate the RSSI values with the second network device based on identifier information (e.g., identifier information 118, identifier information 119) associated with each beacon received. The identifier information can be associated with the second network device and include a service set identifier (SSID), a media access control (MAC) address, combinations thereof, and the like. The first network device can store and/or transmit the expected signal strength (and the identifier information).

At 604, a measured signal strength can be received. The measured signal strength can be received from the first network device. The measured signal strength can be associated with the second network device. The measured signal strength can be determined by e first network device during a probe/scan of the network (e.g., network 105). During the probe/scan of the network, the first network device can measure a signal strength (e.g., received signal strength, RSSI, etc . . . ) associated with the second network device for a duration/time window. For example, the first network device can probe/scan the network for a time window of 20 microseconds and receive one or more beacons from the second network device during the time window. The one or more beacons can comprise an RSSI value decibel value, amplitude value, power value, etc.) associated with the second network device that is measured by the first network device. Based on measuring, such as during a probe/scan of the network, signal strengths associated with the second network device, the first network device can store and/or transmit the measured signal strength.

At 606, it can be determined that the second network device is compromised. For example, the device (e.g., network devices 116a and 116b, access points 201-203, access points 301-302, authorized access point, computing device 104, remote computing device, etc . . . ) can determine that the second network device is compromised. The device can determine that the second network device is compromised (e.g., the identifier information associated with the second network device is compromised) based on a variance between the expected signal strength and the measured signal strength exceeding a threshold. For example, the expected signal strength can be at a value of 70 dB and the measured signal strength can be a value of 30 dB. The measured signal strength can be at the value of 30 dB because a rogue hotspot (e.g., rogue device 117, rogue access point 204, unauthorized access points, etc.) may be present in the network.

The rogue hotspot can be a device set up by a malicious entity that copies and/or assigns similar identifier information (e.g., identifier information 118, identifier information 119, MAC address, SSID) as the second network device. For example, the rogue hotspot can copy the identifier information associated with the second network device and periodically and/or consistently transmit/broadcast one or more beacons comprising the copied identifier information. The one or more beacons transmitted/broadcast by the rogue hotspot can be associated with a RSSI value of 30 dB. During a probe/scan of the network, the first device can receive beacons from the second network device and the rogue hotspot. The first network device may mistakenly determine the beacons as originating from a single device (e.g., the second network device) based on the identifier information and copied identifier information matching and/or being similar. The rogue hotspot can be associated with an RSSI that is inconsistent in value, fluctuates, and/or exhibits erratic behavior during a time window associated with a probe/scan of the network by the first network device. The difference in value between the expected signal strength and the measured signal strength can exceed a threshold variance from 70 dB. A threshold variance value can be set at any suitable value, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used. As such, the device can determine that the identifier information associated with the second network device is compromised based on the variance between the expected signal strength and the measured signal strength exceeding the threshold. The device can store the identifier information associated with the second network device as compromised identifier information.

At 608, a message can be transmitted to the second network device. For example, the device can transmit the message to the second network device. The message can be transmitted in response to the variance between the expected signal strength and the measured signal strength exceeding the threshold. The message can causes the second network device to disconnect any user devices in communication with the second network device based on the identifier information associated with the second network device. For example, the message can be a deauthentication message (e.g., deauthentication frame, disassociate frame, etc . . . ). The message can cause the second network device to change its associated identifier information to new network identifier information. The message can also causes the second network device be in communication, via the new identifier information, with at least one device (e.g., user device, user device 102, etc . . . ) that was in communication with the second network device based on the compromised identifier information.

FIG. 7 is a flowchart of an example method. At 702, a baseline signal strength can be determined. The baseline signal strength can be determined by a device (e.g., network devices 116a and 116b, access points 201-203, access points 301-302, authorized access point, etc . . . ) in a network (e.g., network 105). The baseline signal strength can be associated with a network device network devices 116a and 116b, access points 201-203, access points 301-302, authorized access point, etc . . . ). The baseline signal strength can be a manually provisioned signal strength. For example, the device can be manually provisioned during an initial network deployment, network discovery/set-up, network arrangement, and the like. The baseline signal strength can be a dynamically determined signal strength. The baseline signal strength can be determined by the device during a probe/scan of the network. During the probe/scan of the network the device can measure a signal strength (e.g., received signal strength, RSSI, etc . . . ) associated with the network device for a duration/time window. For example, the device can probe/scan the network for a time window of 20 microseconds and receive one or more beacons from the network device during the time window. The device can summate (e.g., average) the RSSI values to determine the baseline signal strength. The one or more beacons can comprise an RSSI value (e.g., decibel value, amplitude value, power value, etc.) associated with the network device. The device can associate the RSSI values with the network device based on identifier information (e.g., identifier information 118, identifier information 119) associated with each beacon received. The identifier information can be associated with the network device and include a service set identifier (SSID), a media access control (MAC) address, combinations thereof, and the like. The device can store and/or transmit the baseline signal strength (and the identifier information).

At 702, the device can determine that for a quantity/number of times within a time window, a signal strength associated with the network device exceeds a threshold variance from the baseline signal strength. The device can determine that the signal strength associated with the network device exceeds the threshold variance from the baseline signal strength based on a probe/scan of the network. For example, the baseline signal strength can be 70 dB. The device, during a probe/scan of the network, can receive beacons from the network device and a rogue hotspot. The device may mistakenly determine that the beacons originate from a single device (e.g., the network device) based on the identifier information. For example, the rogue hotspot can copy the identifier information associated with the network device and broadcast beacons associated with the copied identifier information. The rogue hotspot can be associated with signal strengths that are inconsistent in value, fluctuate, and/or exhibits erratic behavior during a time window associated with a probe/scan of the network by the device. The difference in value between the baseline signal strength and the signal strength associated with the network device can exceed a threshold variance from 70 dB. A threshold variance value can be set at any suitable value, for example, +/−1 dB, 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, and the like. One of skill in the art will appreciate that other threshold variances can be used and can vary depending on what measurement is used. As such, the device can determine that the identifier information associated with the network device is compromised based on the variance between the baseline signal strength and the signal strength associated with the network device exceeding the threshold. The device can store the identifier information associated with the network device as compromised identifier information.

At 704, the device can transmit a message to the network device. The device can transmit the message to the network device in response to the signal strength exceeding the threshold. The message can be transmitted in response to the variance between the baseline signal strength and the signal strength exceeding the threshold. The message can causes the network device to disassociate from any user devices in communication with the network device based on the identifier information associated with the network device. For example, the message can be a deauthentication message (e.g., deauthentication frame, disassociate frame, etc . . . ). The message can cause the network device to change its associated identifier information to new identifier information. The message can also causes the network device be in communication, via the new identifier information, with at least one device e.g., user device, user device 102, etc . . . ) that was in communication with the network device based on the compromised identifier information.

The methods and systems can be implemented on a computer 801 (e.g., computing device) as shown in FIG. 8 and described below. By way of example, the user device 102, the computing device 104, the network device 116, the rogue device 117, the access points 201-203, the rogue access point 204, the access points 301-302, the user device 304, the rogue device 305, and the cloud-based device 306 can be a computer as shown in FIG. 8. Similarly, the methods and systems disclosed can utilize one or more computers to perform one or more functions in one or more locations. FIG. 8 is a block diagram of an example operating environment for performing the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components shown in the example operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc, that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors 803, a system memory 812, and a system bus 813 that couples various system components including the one or more processors 803 to the system memory 812. The system can utilize parallel computing.

The system bus 813 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the one or more processors 803, a mass storage device 804, an operating system 805, rogue device detection software 806, signal and identifier data 807, a network adapter 808, the system memory 812, an Input/Output Interface 810, a display adapter 809, a display device 811, and a human machine interface 802, can be contained within one or more remote computing devices 814a, 814b, 814c at physically separate locations, connected through buses of this form, in effect implementing a fully distributed system.

The computer 801 typically comprises a variety of computer readable media. Example readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the signal and identifier data 807 and/or program modules such as the operating system 805 and the rogue device detection software 806 that are immediately accessible to and/or are presently operated on by the one or more processors 803.

The computer 801 can also comprise other removable/non-removable, volatile/non-volatile computer storage media. By way of example, FIG. 8 shows the mass storage device 804 which can provide non-volatile storage of computer code, computer readable instructions, data structures, program modules, and other data for the computer 801. For example and not meant to be limiting, the mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any quantity/number of program modules can be stored on the mass storage device 804, including by way of example, the operating system 805 and the rogue device detection software 806. Each of the operating system 805 and the rogue device detection software 806 (or some combination thereof) can comprise elements of the programming and the rogue device detection software 806. The signal and identifier data 807 can also be stored on the mass storage device 804. The signal and identifier data 807 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

The user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB).

The display device 811 can also be connected to the system bus 813 via an interface, such as the display adapter 809. It is contemplated that the computer 801 can have more than one display adapter 809 and the computer 801 can have more than one display device 811. For example, the display device 811 can be a monitor, an LCD (Liquid Crystal Display), or a projector. In addition to the display device 811, other output peripheral devices can comprise components such as speakers (not shown) and a printer (not shown) which can be connected to the computer 801 via the Input/Output Interface 810. Any step and/or result of the methods can be output in any form to an output device. Such output can be any form of visual representation, including, but not limited to, textual, graphical, animation, audio, tactile, and the like. The display device 811 and computer 801 can be part of one device, or separate devices.

The computer 801 can operate in a networked environment using logical connections to one or more remote computing devices 814a, 814b, 814c. By way of example, a remote computing device can be a personal computer, portable computer, smartphone, a server, a router, a network computer, a peer device or other common network node, and so on. Logical connections between the computer 801 and a remote computing device 814a, 814b, 814c can be made via a network 815, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components reside at various times in different storage components of the computing device 801, and are executed by the one or more processors 803 of the computer. An implementation of the rogue device detection software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with specific examples, it is not intended that the scope be limited to the particular example set forth, as the examples herein are intended in all respects to be example rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations can be made without departing from the scope or spirit. Other examples will be apparent to those skilled in the art from consideration of the specification and practice disclosed herein. It is intended that the specification and examples be considered as examples only, with a true scope and spirit being indicated by the following claims.

What is claimed is:

1. A method comprising:
   determining a baseline signal strength associated with a network device, wherein the network device is associated with network identifier information;
   determining, at a plurality of times during a time window, a plurality of signal strengths associated with the network identifier information;
   determining, based on a threshold quantity of the plurality of signal strengths satisfying a variance threshold associated with the baseline signal strength, that the network identifier information is compromised; and
   sending an indication that the network identifier information is compromised.

2. The method of claim 1, wherein the indication causes the network device to disconnect any user devices in communication with the network device based on the network identifier information and to change the network identifier information to new network identifier information.

3. The method of claim 2, wherein the indication further causes the network device to be in communication, via the new network identifier information, with at least one user device that was in communication with the network device based on the network identifier information.

4. The method of claim 1, wherein determining the baseline signal strength is based on provisioning information associated with the network device.

5. The method of claim 1, wherein determining the baseline signal strength is based on a plurality of signal strength measurements determined by a plurality of devices.

6. The method of claim 1, wherein determining the baseline signal strength is based on an average of a plurality of signal strength measurements.

7. The method of claim 1, wherein the network identifier information comprises a service set identifier, a media access control address, or combinations thereof.

8. The method of claim 1, wherein the variance threshold is based on one or more of amplitude, power, or combinations thereof.

9. The method of claim 1, wherein the plurality of times during the time window is one or more of a manually determined quantity of times during the time window, a dynamically determined quantity of times during the time window, or combinations thereof.

10. The method of claim 1, wherein the indication that the network identifier information is compromised comprises at least a portion of the threshold quantity of the plurality of signal strengths and sending the indication comprises sending the indication to a remote computing device.

11. The method of claim 1, further comprising, sending, to the network device, an instruction to change the network identifier information to new network identifier information.

12. The method of claim 10, further comprising:
   determining, by the remote computing device, based on a difference between a provisioned signal strength and the threshold quantity of the plurality of signal strengths that satisfied the variance threshold, that the network device is compromised; and
   sending a message to the network device, wherein the message causes the network device to disconnect any user devices in communication with the network device based on the network identifier information, and change the network identifier information to new network identifier information.

13. An apparatus, comprising:
   one or more processors; and
   a memory storing processor-executable instructions that, when executed by the one or more processors, cause the apparatus to:
   determine a baseline signal strength associated with a network device, wherein the network device is associated with network identifier information;
   determine, at a plurality of times during a time window, a plurality of signal strengths associated with the network identifier information;
   determine, based on a threshold quantity of the plurality of signal strengths satisfying a variance threshold associated with the baseline signal strength, that the network identifier information is compromised; and
   send an indication that the network identifier information is compromised.

14. The apparatus of claim 13, wherein the indication causes the network device to disconnect any user devices in communication with the network device based on the network identifier information and to change the network identifier information to new network identifier information.

15. The apparatus of claim 14, wherein the indication further causes the network device to be in communication, via the new network identifier information, with at least one user device that was in communication with the network device based on the network identifier information.

16. The apparatus of claim 14, wherein the processor-executable instructions, when executed by the one or more processors, further cause the apparatus to send, to the network device, an instruction to change the network identifier information to new network identifier information.

17. The apparatus of claim 14, wherein the processor-executable instructions that, when executed by the one or more processors, cause the apparatus to determine the baseline signal strength cause the apparatus to determine the baseline signal strength based on provisioning information associated with the network device.

18. The apparatus of claim 14, wherein the processor-executable instructions that, when executed by the one or more processors, cause the apparatus to determine the baseline signal strength cause the apparatus to determine the baseline signal strength based on a plurality of signal strength measurements determined by a plurality of devices.

19. The apparatus of claim 14, wherein the processor-executable instructions that, when executed by the one or more processors, cause the apparatus to determine the baseline signal strength cause the apparatus to determine the baseline signal strength based on an average of a plurality of signal strength measurements.

20. The apparatus of claim 14, wherein the network identifier information comprises a service set identifier, a media access control address, or combinations thereof.

21. The apparatus of claim 14, wherein the variance threshold is based on one or more of amplitude, power, or combinations thereof.

22. The apparatus of claim 14, wherein the plurality of times during the time window is one or more of a manually determined quantity of times during the time window, a dynamically determined quantity of times during the time window, or combinations thereof.

23. The apparatus of claim 14, wherein the indication that the network identifier information is compromised comprises at least a portion of the threshold quantity of the plurality of signal strengths and sending the indication comprises sending the indication to a remote computing device.

24. The apparatus of claim 23, wherein the processor-executable instructions, when executed by the one or more processors, further cause the apparatus to
determine, by the remote computing device, based on a difference between a provisioned signal strength and the threshold quantity of the plurality of signal strengths that satisfied the variance threshold, that the network device is compromised; and
send a message to the network device, wherein the message causes the network device to disconnect any user devices in communication with the network device based on the network identifier information and change the network identifier information to new network identifier information.

25. One or more non-transitory computer-readable media storing processor-executable instructions that, when executed by at least one processor, cause the at least one processor to:
determine a baseline signal strength associated with a network device, wherein the network device is associated with network identifier information;
determine, at a plurality of times during a time window, a plurality of signal strengths associated with the network identifier information;
determine, based on a threshold quantity of the plurality of signal strengths satisfying a variance threshold associated with the baseline signal strength, that the network identifier information is compromised; and
send an indication that the network identifier information is compromised.

26. The one or more non-transitory computer-readable media of claim 25, wherein the indication causes the network device to disconnect any user devices in communication with the network device based on the network identifier information and to change the network identifier information to new network identifier information.

27. The one or more non-transitory computer-readable media of claim 26, wherein the indication further causes the network device to be in communication, via the new network identifier information, with at least one user device that was in communication with the network device based on the network identifier information.

28. The one or more non-transitory computer-readable media of claim 25, wherein determining the baseline signal strength is based on provisioning information associated with the network device.

29. The one or more non-transitory computer-readable media of claim 25, wherein determining the baseline signal strength is based on a plurality of signal strength measurements determined by a plurality of devices.

30. The one or more non-transitory computer-readable media of claim 25, wherein determining the baseline signal strength is based on an average of a plurality of signal strength measurements.

31. The one or more non-transitory computer-readable media of claim 25, wherein the network identifier information comprises a service set identifier, a media access control address, or combinations thereof.

32. The one or more non-transitory computer-readable media of claim 25, wherein the variance threshold is based on one or more of amplitude, power, or combinations thereof.

33. The one or more non-transitory computer-readable media of claim 25, wherein the plurality of times during the time window is one or more of a manually determined quantity of times during the time window, a dynamically determined quantity of times during the time window, or combinations thereof.

34. The one or more non-transitory computer-readable media of claim 25, wherein the indication that the network identifier information is compromised comprises at least a portion of the threshold quantity of the plurality of signal strengths and sending the indication comprises sending the indication to a remote computing device.

35. The one or more non-transitory computer-readable media of claim 34, wherein the processor-executable instructions, when executed by the at least one processor, further cause the at least one processor to:
determine, by the remote computing device, based on a difference between a provisioned signal strength and the threshold quantity of the plurality of signal strengths that satisfied the variance threshold, that the network device is compromised; and
send a message to the network device, wherein the message causes the network device to disconnect any user devices in communication with the network device based on the network identifier information, and change the network identifier information to new network identifier information.

36. The one or more non-transitory computer-readable media of claim 25, wherein the processor-executable instructions, when executed by the at least one processor, further cause the at least one processor to send, to the network device, an instruction to change the network identifier information to new network identifier information.

37. A system comprising:
a first network device comprising at least one processor and memory configured to:
send a message to a computing device comprising at least one processor and memory, wherein the message comprises a signal strength associated with a second network device; and
the computing device configured to:
receive the message;
determine, based on the signal strength associated with the second network device, a baseline signal strength associated with the second network device, wherein the second network device is associated with network identifier information;
determine, at a plurality of times during a time window, a plurality of signal strengths associated with the network identifier information;
determine, based on a threshold quantity of the plurality of signal strengths satisfying a variance threshold associated with the baseline signal strength, that the network identifier information is compromised; and send an indication that the network identifier information is compromised.

38. The system of claim 37, wherein the indication causes the second network device to disconnect any user devices in communication with the second network device based on the network identifier information and to change the network identifier information to new network identifier information.

39. The system of claim 38, wherein the indication further causes the second network device to be in communication, via the new network identifier information, with at least one user device that was in communication with the second network device based on the network identifier information.

40. The system of claim 37, wherein the computing device is further configured to determine the baseline signal strength based on provisioning information associated with the second network device.

41. The system of claim 37, wherein the computing device is further configured to determine the baseline signal strength based on a plurality of signal strength measurements determined by a plurality of network devices.

42. The system of claim 37, wherein the computing device is further configured to determine the baseline signal strength based on an average of a plurality of signal strength measurements.

43. The system of claim 37, wherein the network identifier information comprises a service set identifier, a media access control address, or combinations thereof.

44. The system of claim 37, wherein the variance threshold is based on one or more of amplitude, power, or combinations thereof.

45. The system of claim 37, wherein the plurality of times during the time window is one or more of a manually determined quantity of times during the time window, a dynamically determined quantity of times during the time window, or combinations thereof.

46. The system of claim 37, wherein the indication that the network identifier information is compromised comprises at least a portion of the threshold quantity of the plurality of signal strengths and sending the indication comprises sending the indication to a remote computing device.

47. The system of claim 46, wherein the remote computing device is configured to:
  determine, based on a difference between a provisioned signal strength and the threshold quantity of the plurality of signal strengths that satisfied the variance threshold, that the second network device is compromised; and
  send a second message to the second network device, wherein the second message causes the second network device to disconnect any user devices in communication with the second network device based on the network identifier information, and change the network identifier information to new network identifier information.

48. The system of claim 37, wherein the computing device is further configured to send, to the second network device, an instruction to change the network identifier information to new network identifier information.

* * * * *